US011618159B2

(12) United States Patent
Zhang et al.

(10) Patent No.: US 11,618,159 B2
(45) Date of Patent: Apr. 4, 2023

(54) SOFT CONTINUUM ROBOTIC MODULE

(71) Applicants: Wenlong Zhang, Chandler, AZ (US); Pham Huy Nguyen, Mesa, AZ (US); Zhi Qiao, Tempe, AZ (US); Sam Seidel, Scottsdale, AZ (US); Imran I. B. Mohd, Tempe, AZ (US); Sunny Amatya, Mesa, AZ (US)

(72) Inventors: Wenlong Zhang, Chandler, AZ (US); Pham Huy Nguyen, Mesa, AZ (US); Zhi Qiao, Tempe, AZ (US); Sam Seidel, Scottsdale, AZ (US); Imran I. B. Mohd, Tempe, AZ (US); Sunny Amatya, Mesa, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 17/224,809

(22) Filed: Apr. 7, 2021

(65) Prior Publication Data
US 2021/0308861 A1    Oct. 7, 2021

Related U.S. Application Data

(60) Provisional application No. 63/006,358, filed on Apr. 7, 2020.

(51) Int. Cl.
*B25J 9/14*    (2006.01)
*B25J 18/06*   (2006.01)
*B25J 13/08*   (2006.01)
*B25J 9/10*    (2006.01)

(52) U.S. Cl.
CPC ............. *B25J 9/142* (2013.01); *B25J 9/1075* (2013.01); *B25J 13/088* (2013.01); *B25J 18/06* (2013.01)

(58) Field of Classification Search
CPC ........ B25J 9/142; B25J 9/1075; B25J 13/088; B25J 18/06
See application file for complete search history.

(56) References Cited

U.S. PATENT DOCUMENTS

| | | | | |
|---|---|---|---|---|
| 4,739,692 A | * | 4/1988 | Wassam | B25J 17/0275 92/92 |
| 4,784,042 A | * | 11/1988 | Paynter | F15B 15/103 92/92 |
| 4,792,173 A | * | 12/1988 | Wilson | B25J 9/142 92/92 |
| 5,205,774 A | * | 4/1993 | Smrt | A63H 3/48 446/180 |

(Continued)

OTHER PUBLICATIONS

Kevin C. Galloway, Jan. 24, 2019, "Manufacturing Soft Devices Out of Sheet Materials", U.S. Pat. No. 10718358, URL: https://patents.justia.com/patent/10718358.

(Continued)

*Primary Examiner* — William C Joyce
(74) *Attorney, Agent, or Firm* — Snell & Wilmer L.L.P.

(57) ABSTRACT

A soft continuum robotic module comprises a plurality of inflatable actuators disposed between plates. Via inflation or deflation of one or more of the actuators, the module may extend, contract, twist, bend, and/or exert a grasping force. One or more modules may be combined to form a robotic arm with multiple degrees of freedom.

6 Claims, 23 Drawing Sheets

Multi-Axis Bending

(56) References Cited

U.S. PATENT DOCUMENTS

2017/0282360 A1* 10/2017 Telleria ..................... F16J 3/04

OTHER PUBLICATIONS

Kevin C. Galloway et al., Jan. 17, 2019, "Fabric-Based Soft Actuators", U.S. Appl. No. 16/068,290, URL: https://patents.justia.com/patent/20190015233.

Abstract; Leonardo Cappello et al., "Exploiting Textile Mechanical Anisotropy for Fabric-Based Pneumatic Actuators", Soft Robotics, Oct. 18, 2018, vol. 5, No. 5, Mary Ann Liebert, Inc., URL: https://www.liebertpub.com/doi/full/10.1089/soro.2017.0076.

Fionnuala Connolly, "Automatic design of fiber-reinforced soft actuators for trajectory matching", PNAS, Jan. 3, 2017, 114 (1) pp. 51-56, URL: https://www.pnas.org/content/114/1/51.

Abstract; Pham H. Nguyen et al., Design, Characterization, and Mechanical Programming of Fabric-Reinforced Textile Actuators for a Soft Robotic Hand, IEEE Xplore, Jan. 27, 2020, URL: https://ieeexplore.ieee.org/document/8968497.

D. Rus and M. T. Tolley, "Design, fabrication and control of soft robots," Nature, vol. 521, No. 7553, pp. 467-475, 2015.

C. Laschi, B. Mazzolai, and M. Cianchetti, "Soft robotics: Technologies and systems pushing the boundaries of robot abilities," Science Robotics, vol. 1, No. 1, 2016.

J. Shintake, V. Cacucciolo, D. Floreano, and H. Shea, "Soft robotic grippers," Advanced Materials, vol. 30, No. 29, p. 1 707 035, M. Runciman, A. Darzi, and G. P. Mylonas, "Soft robotics in minimally invasive surgery," Soft Robotics, vol. 0, No. 0, null, 0, PMID: 30920355.

P. Polygerinos, N. Correll, S. A. Morin, B. Mosadegh, C. D. Onal, K. Petersen, M. Cianchetti, M. T. Tolley, and R. F. Shepherd, "Soft Robotics: Review of Fluid-Driven Intrinsically Soft Devices; Manufacturing, Sensing, Control, and Applications in Human-Robot Interaction," Advanced Engineering Materials, vol. 19, No. 12, e201700016, M. Cianchetti, C. Laschi, A. Menciassi, and P. Dario, "Biomedical applications of soft robotics," Nature Reviews Materials, vol. 3, No. 6, pp. 143-153, 2018.

T. George Thuruthel, Y. Ansari, E. Falotico, and C. Laschi, "Control strategies for soft robotic manipulators: A survey," Soft Robotics, vol. 5, No. 2, pp. 149-163, 2018.

W. McMahan, B. A. Jones, and I. D. Walker, "Design and implementation of a multi-section continuum robot: Air-octor," in 2005 IEEE/RSJ International Conference on Intelligent Robots and Systems, IROS, Aug. 2005, pp. 3345-3352.

M. Calisti, M. Giorelli, G. Levy, B. Mazzolai, B. Hochner, C. Laschi, and P. Dario, "An octopus-bioinspired solution to movement and nanipulation for soft robots," Bioinspiration & Biomimetics, vol. 6, No. 3, p. 36 002, 2011.

I. S. Godage, G. A. Medrano-Cerda, D. T. Branson, E. Guglielmino, and D. G. Caldwell, "Dynamics for variable length multisection continuum arms," The International Journal of Robotics Research, vol. 35, No. 6, pp. 695-722, 2016.

M. Cianchetti, T. Ranzani, G. Gerboni, I. D. Falco, C. Laschi, S. Member, and A. Menciassi, "STIFF-FLOP surgical manipulator: Mechanical design and experimental characterization of the single module," in 2013 IEEE/RSJ International Conference on Intelligent Robots and Systems, Nov. 2013, pp. 3576-3581.

P. H. Nguyen, C. Sparks, S. G. Nuthi, N. M. Vale, and P. Polygerinos, "Soft Poly-Limbs: Toward a New Paradigm of Mobile Manipulation for Daily Living Tasks," Soft Robotics, soro.2018.0065, 2018.

A. D. Marchese and D. Rus, "Design, kinematics, and control of a soft spatial fluidic elastomer manipulator," The International Journal of Robotics Research, vol. 35, No. 7, pp. 0 278 364 915 587 925-, 2015.

T. Liu, Y. Wang, and K. Lee, "Three-dimensional printable origami twisted tower: Design, fabrication, and robot embodiment," IEEE Robotics and Automation Letters, vol. 3, No. 1, pp. 116-123, Jan. 2018.

S.-J. Kim, D.-Y. Lee, G.-P. Jung, and K.-J. Cho, "An origami-inspired, self-locking robotic arm that can be folded flat," Science Robotics, vol. 3, No. 16, 2018.

C. M. Best, M. T. Gillespie, P. Hyatt, L. Rupert, V. Sherrod, and M. D. Killpack, "A new soft robot control method: Using model predictive control for a pneumatically actuated humanoid," IEEE Robotics Automation Magazine, vol. 23, No. 3, pp. 75-84, Sep. 2016.

P. H. Nguyen, I. B. Imran Mohd, C. Sparks, F. L. Arellano, W. Zhang, and P. Polygerinos, "Fabric soft poly-limbs for physical assistance of daily living tasks," in 2019 International Conference on Robotics and Automation (ICRA), May 2019, pp. 8429-8435.

X. Liang, H. Cheong, Y. Sun, J. Guo, C. K. Chui, and C. Yeow, "Design , Characterization and Implementation of a Two-DOF Fabric-based Soft Robotic Arm," IEEE Robotics and Automation Letters, vol. 3766, No. c, pp. 1-8, Jul. 2018.

M. A. Robertson and J. Paik, "New soft robots really suck: Vacuumpowered systems empower diverse capabilities," Science Robotics, vol. 2, No. 9, 2017.

M. Wehner, M. T. Tolley, Y. Menguc,, Y.-L. Park, A. Mozeika, Y. Ding, C. Onal, R. F. Shepherd, G. M. Whitesides, and R. J. Wood, "Pneumatic energy sources for autonomous and wearable soft robotics," Soft robotics, vol. 1, No. 4, pp. 263-274, 2014.

D. P. Holland, C. Abah, M. Velasco-Enriquez, M. Herman, G. J. Bennett, E. A. Vela, and C. J. Walsh, "The soft robotics toolkit: Strategies for overcoming obstacles to the wide dissemination of soft-robotic hardware," IEEE Robotics Automation Magazine, vol. 24, No. 1, pp. 57-64, Mar. 2017.

H. Wang, M. Totaro, and L. Beccai, "Toward perceptive soft robots: Progress and challenges," Advanced Science, vol. 5, No. 9, p. 1 800 541, 2018.

B. Shih, D. Drotman, C. Christianson, Z. Huo, R. White, H. I. Christensen, and M. T. Tolley, "Custom soft robotic gripper sensor skins for haptic object visualization," in 2017 IEEE/RSJ International Conference on Intelligent Robots and Systems (IROS), Sep. 2017, pp. 494-501.

H. A. Wurdemann, S. Sareh, A. Shafti, Y. Noh, A. Faragasso, D. S. Chathuranga, H. Liu, S. Hirai, and K. Althoefer, "Embedded electroconductive yarn for shape sensing of soft robotic manipulators," in 2015 37th Annual International Conference of the IEEE Engineering in Medicine and Biology Society (EMBC), Aug. 2015, pp. 8026-8029.

P. A. Xu, A. K. Mishra, H. Bai, C. A. Aubin, L. Zullo, and R. F. Shepherd, "Optical lace for synthetic afferent neural networks," Science Robotics, vol. 4, No. 34, 2019.

M. C. Yuen, T. R. Lear, H. Tonoyan, M. Telleria, and R. Kramer-Bottiglio, "Toward closed-loop control of pneumatic grippers during back-and-deploy operations," IEEE Robotics and Automation Letters, vol. 3, No. 3, pp. 1402-1409, Jul. 2018.

R. L. Truby, R. K. Katzschmann, J. A. Lewis, and D. Rus, "Soft robotic fingers with embedded ionogel sensors and discrete actuation modes for somatosensitive manipulation," in 2019 2nd IEEE International Conference on Soft Robotics (RoboSoft), Apr. 2019, pp. 322-329.

P. H. Nguyen, F. Lopez-Arellano, W. Zhang, and P. Polygerinos, "Design, characterization, and mechanical programming of fabricreinforced .extile actuators for a soft robotic hand," in 2019 IEEE/RSJ International Conference on Intelligent Robots and Systems (IROS), Nov. 2019, pp. 8312-8317.

R. J. Webster, B. a. Jones, R. J. W. Iii, B. a. Jones, I. I. I. Robert J. Webster, and B. a. Jones, "Design and Kinematic Modeling of Constant Curvature Continuum Robots: A Review," The International Journal of Robotics Research, vol. 29, No. 13, pp. 1661-1683, 2010.

A. Liang, R. Stewart, and N. Bryan-Kinns, "Analysis of sensitivity, inearity, hysteresis, responsiveness, and fatigue of textile knit stretch sensors," Sensors, vol. 19, No. 16, p. 3618, Aug. 2019.

* cited by examiner

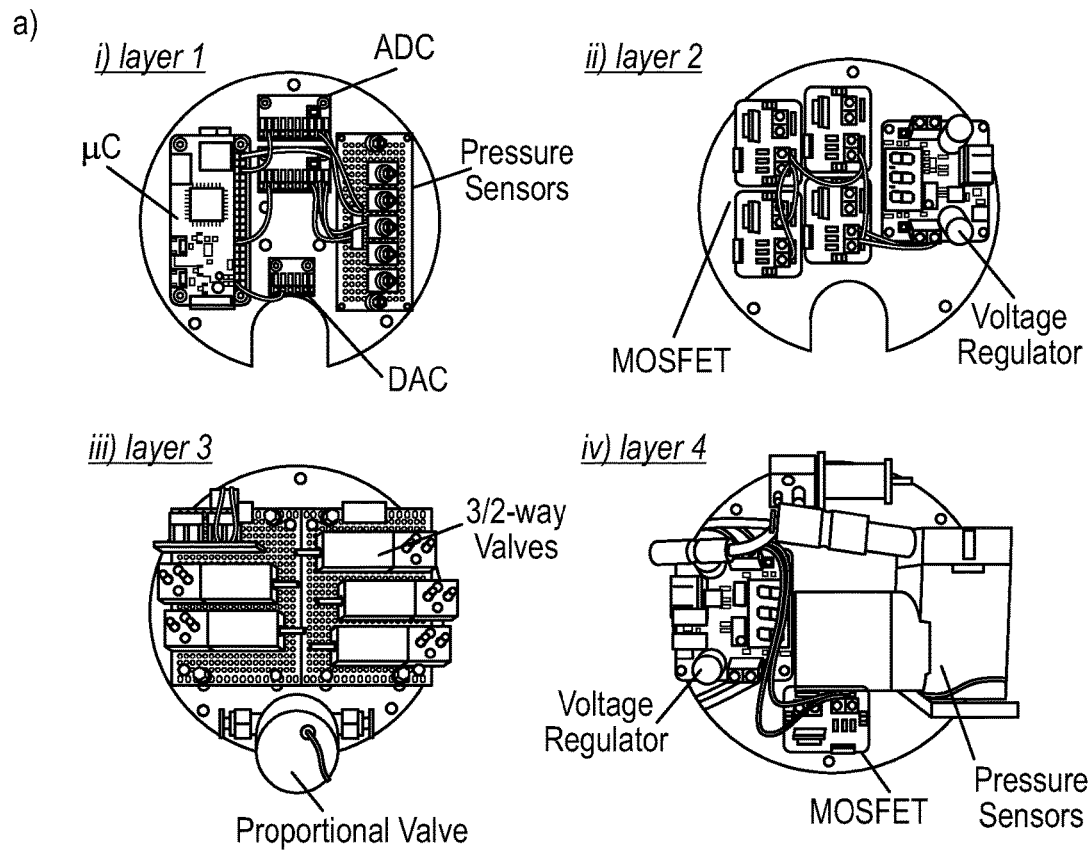
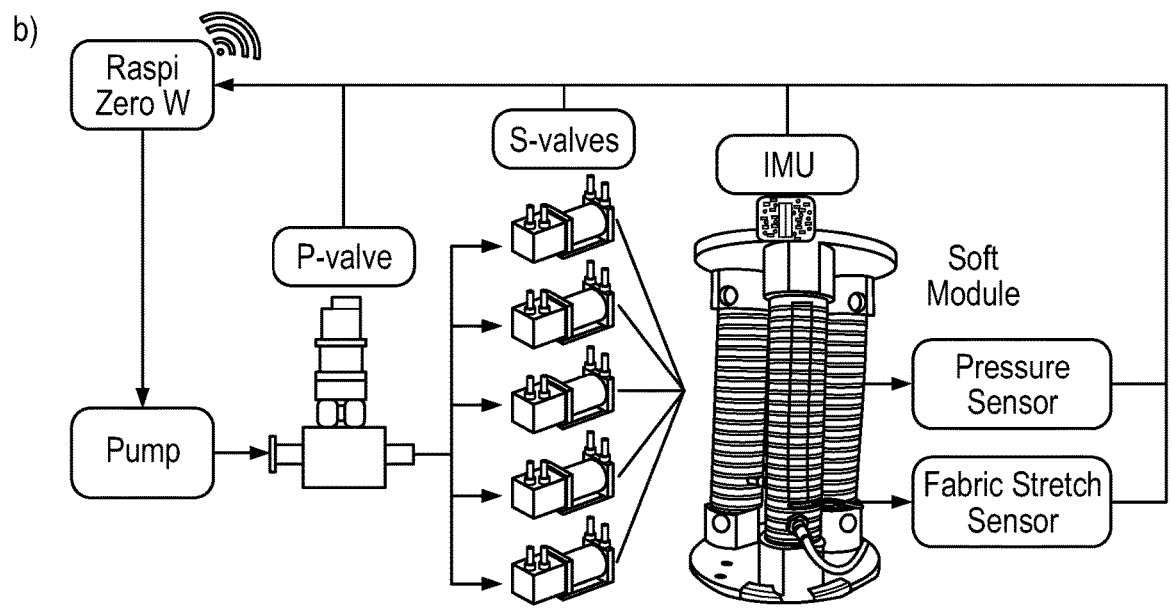
FIG. 3

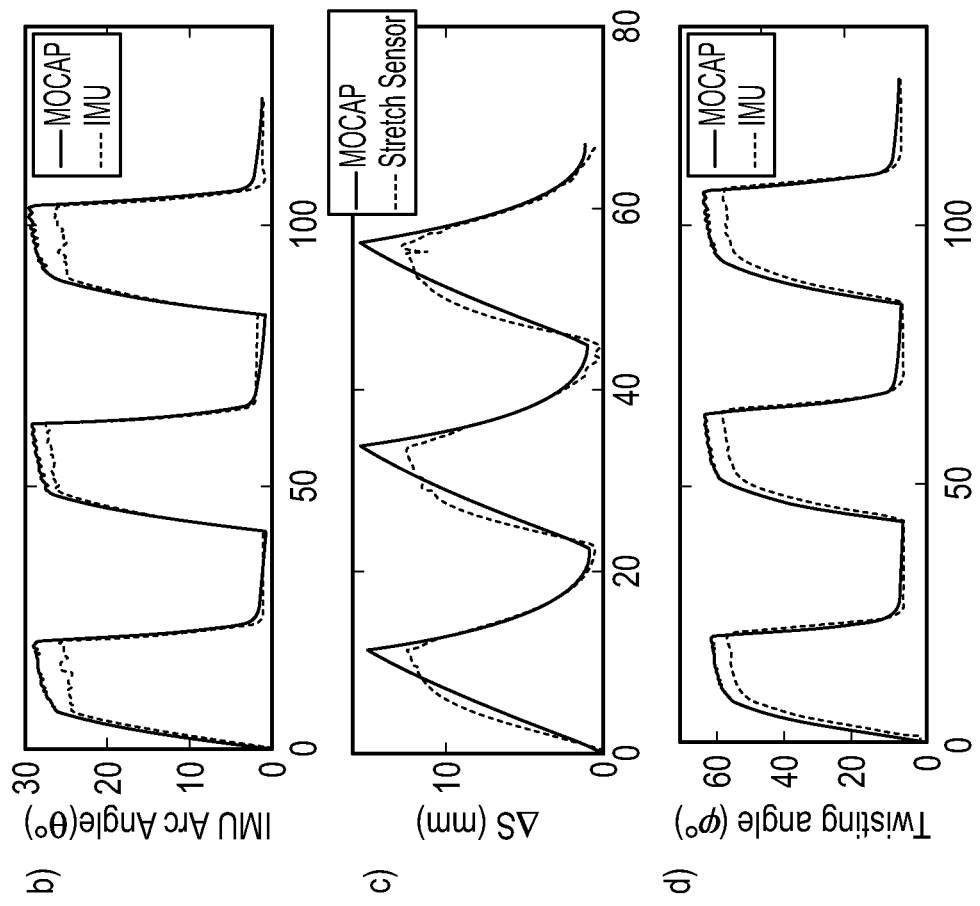
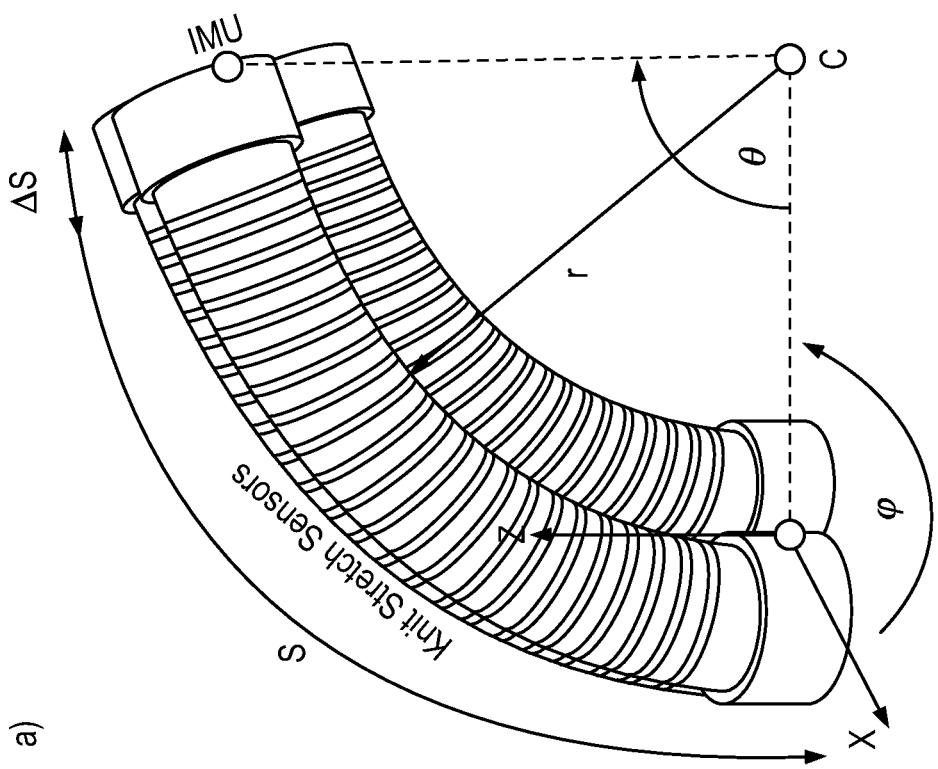
FIG. 6

Multi-Axis Bending

Twisting and Contracting

Bending　　　Twisting Contracting

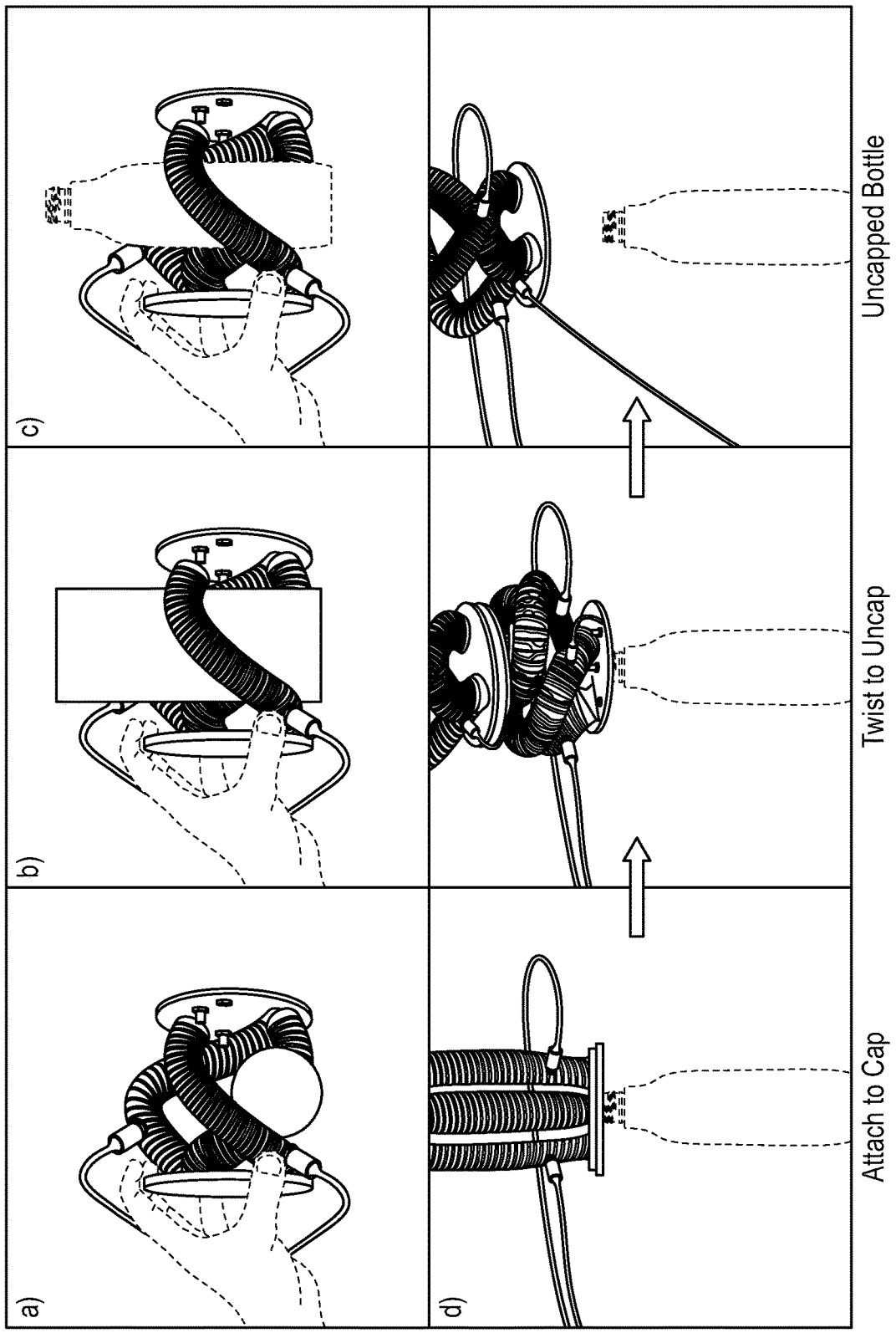

SOFT CONTINUUM ROBOTIC MODULE

CROSS REFERENCE TO RELATED APPLICATIONS

This application claims priority to, and the benefit of, U.S. Provisional Patent Application Ser. No. 63/006,358 entitled "SOFT CONTINUUM ROBOTIC MODULE," filed on Apr. 7, 2020. The content of the foregoing application is hereby incorporated by reference (except for any subject matter disclaimers or disavowals, and except to the extent of any conflict with the disclosure of the present application, in which case the disclosure of the present application shall control).

FEDERALLY SPONSORED RESEARCH OR DEVELOPMENT

This invention was made with government support under 1800940 awarded by the National Science Foundation. The government has certain rights in the invention.

TECHNICAL FIELD

The present disclosure relates to actuators, and in particular to soft continuum robotic actuators.

BRIEF DESCRIPTION OF THE DRAWINGS

With reference to the following description and accompanying drawings:

FIG. 3 illustrates control components and diagrams of an exemplary soft continuum robotic module in accordance with various exemplary embodiments;

FIG. 6 illustrates motion tracking and sensing of an exemplary soft continuum robotic module in accordance with various exemplary embodiments;

FIG. 11 illustrates grasping and twisting operations of an exemplary soft continuum robotic module in accordance with various exemplary embodiments.

DETAILED DESCRIPTION

Figure 1:
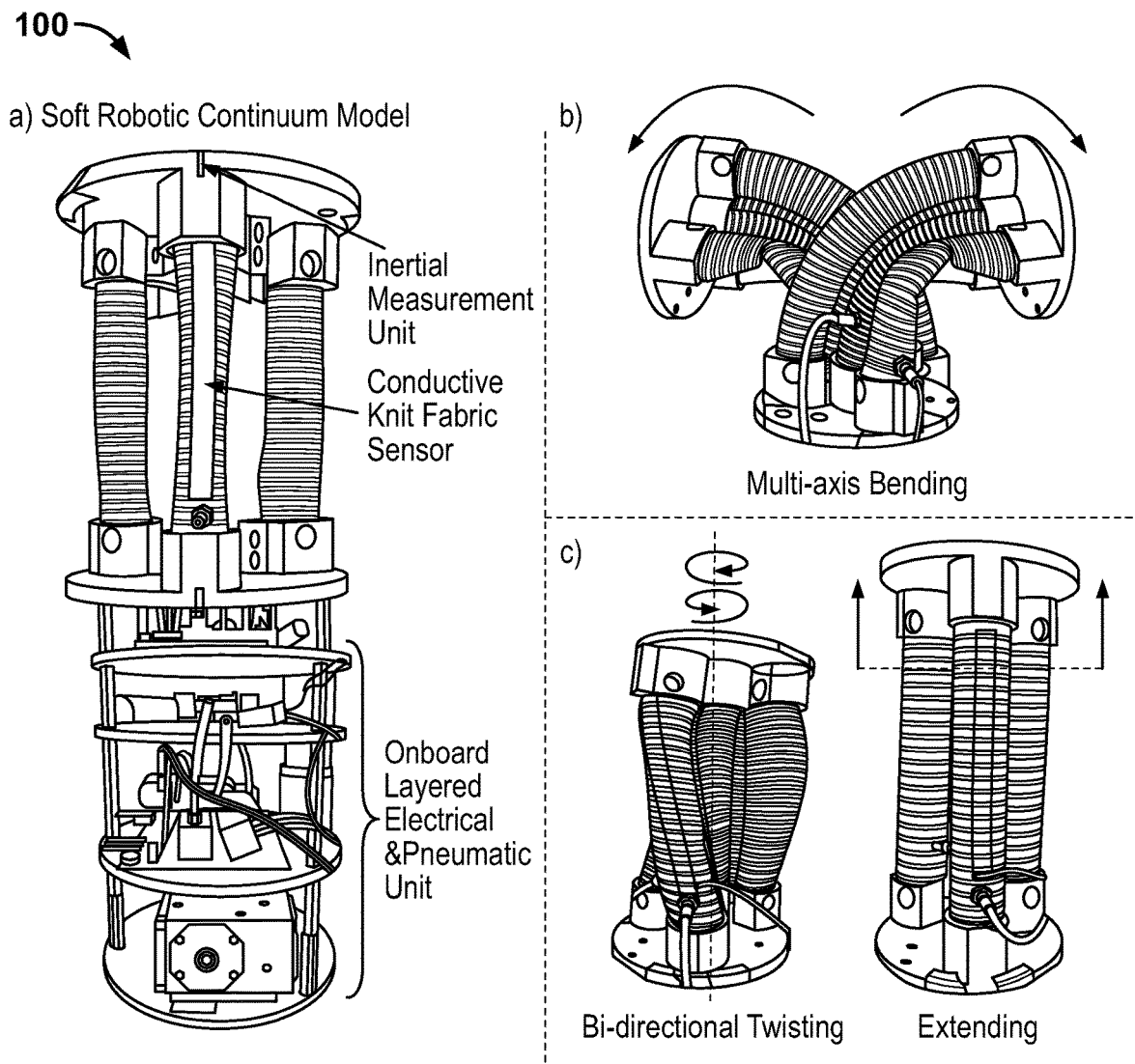
FIG. 1 illustrates an exemplary soft continuum robotic module in accordance with various exemplary embodiments.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques and components for soft, conformable, inflatable, wearable, and/or continuum robotic systems and actuators may not be described in detail herein. Furthermore, the connecting lines shown in various figures contained herein are intended to represent exemplary functional relationships and/or physical couplings between various elements. It should be noted that many alternative or additional functional relationships or physical connections may be present in exemplary soft continuum robotic module and/or components thereof.

Principles of the present disclosure contemplate a continuum, lightweight, multi-degree of freedom (DOF) soft robotic module 100, for example made of high-stretch knit fabric. A set of design criteria, inspired by muscular hydrostats such as those found in elephant trunks, may be utilized in order to create a highly articulated and robust soft robotic module. An exemplary soft continuum robotic module 100 can vertically extend and twist along its central axis, as well as bend in 3D space. The material properties of the knit fabrics are characterized. The bending articulation and payload capabilities of the module are presented. This disclosure also demonstrates the embedded integration of a thin, flexible, and conductive fabric stretch sensor with the module, for example to provide pose information for motion tracking. An on-board electropnuematic system is also disclosed. This system allows for the creation of safe human-robot interfaces comprising a multi-functional integration of multiple soft robotic modular units that are deployable for various complex tasks. Moreover, exemplary systems may be utilized to perform grasping and/or twisting operations.

With the interests in soft robotics on the rise, there have been extensive studies of soft materials, actuation, control, sensing, and even soft pneumatic pumps and valves. Soft robotic systems have shown advantages of being lightweight, highly compliant, articulate, and inherently safe for interactions with the human body and environment. Thus, soft robotic systems have been developed for diverse applications such as locomotion in unstructured environments, manipulation of objects with various sizes and shapes, invasive surgical instruments, and assistive/rehabilitative devices.

Soft continuum robots are popular in manufacturing and surgical tasks as well as activities of daily living (ADL). Such robots have been created by combining various types of soft actuation mechanisms, including cable-driven systems, pneumatic artificial muscles (PAMs), and inflatable actuators made of elastomers, origami, fabric, and combinations of materials. Principles of the present disclosure show versatility and promise in applying elastomeric and woven fabric actuators to build soft continuum robotic arms that are robust, lightweight, and compliant enough to assist with ADL tasks.

However, some prior approaches have been confined to a fixed setting because of a tethered pneumatic source and pose sensing using a motion capture system. For portable pneumatic systems, there have been studies on the use of pneumatic cylinders, compressed air supplies, and storage tanks to power soft robots. In order to develop compact soft robots that are modular and deployable in outdoor applications or used as educational toolkits, the aforementioned portable pneumatic systems can be more bulky than necessary. Accordingly, principles of the present disclosure contemplate use of a compact off-board electropneumatic system to control the soft robotic module.

With high degree-of-freedom (DOF) continuum robots working and interacting with the environment, there is a desire to monitor the compliant and highly deformable nature of the soft robot in order to understand its locomotion capabilities as well as the inherent contact with obstacles. Thus, proprioception and tactile feedback are desirable in controlling the movement of high-DOF continuum robots. To satisfy these desires, different types of soft sensors may be utilized, such as textile electrode-based, liquid metal-based, nanocomposite-based, optical-fiber based, and conductive yarn-based sensors.

In various exemplary embodiments, and with reference now to FIGS. 1 through 6, principles of the present disclosure contemplate a robust, compact, lightweight, and highly articulated soft robotic module 100, inspired by hydrostatic muscles. This disclosure highlights the first soft continuum robot fabricated using stretch fabric, which can not only bend in 3D space, but also vertically extend and bi-directionally twist. Folding and precision multi-layering fabrication techniques may be utilized for low-cost and rapid manufacturing of the actuator. Exemplary embodiments utilize the concept of fabric-reinforced textile actuators (FRTAs), for example made of high-strength and high-stretch knit inflatable fabrics.

Figure 7A:
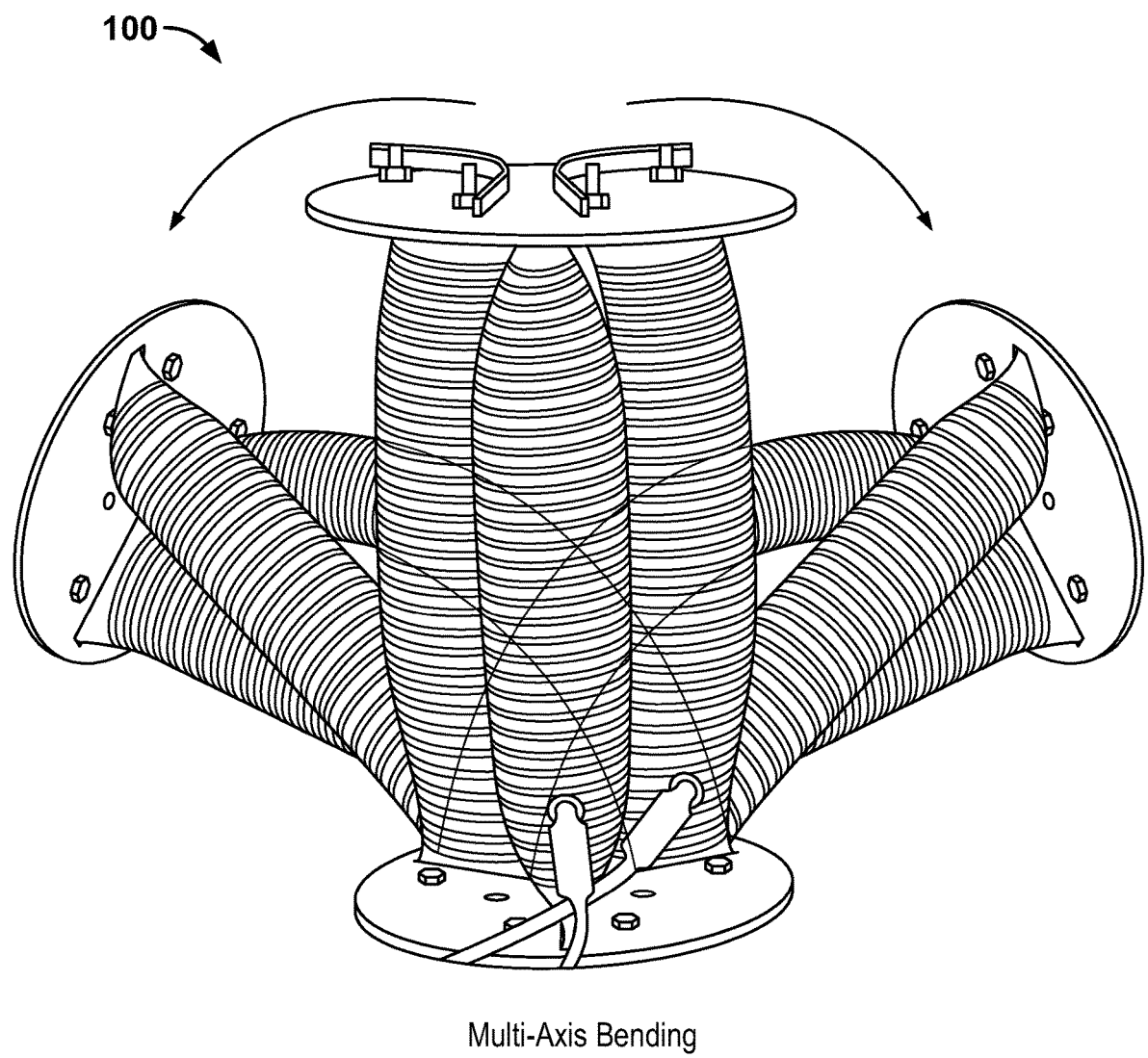
FIGS. 7A, 7B, and 7C illustrate motion of an exemplary soft continuum robotic module in accordance with various exemplary embodiments.
Figure 7B:
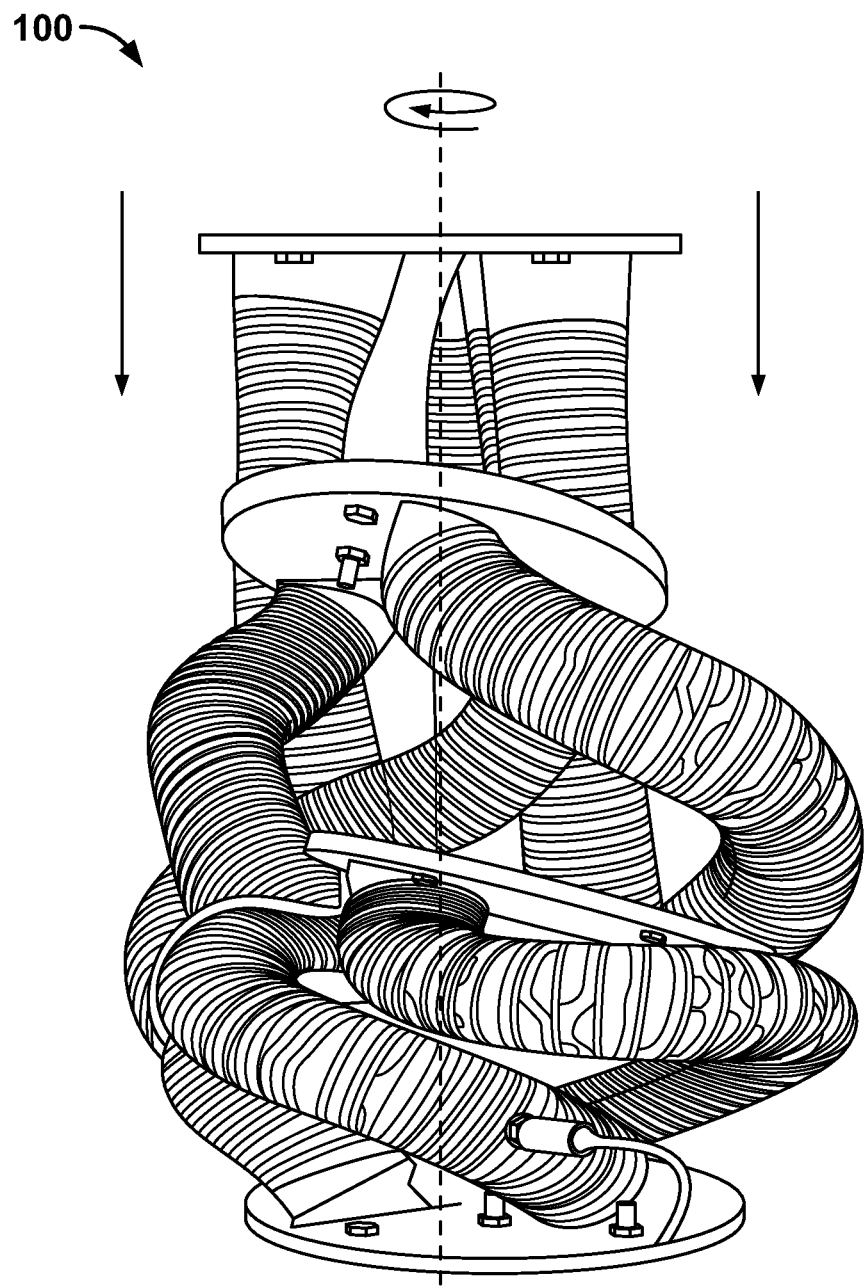
Figure 7C:
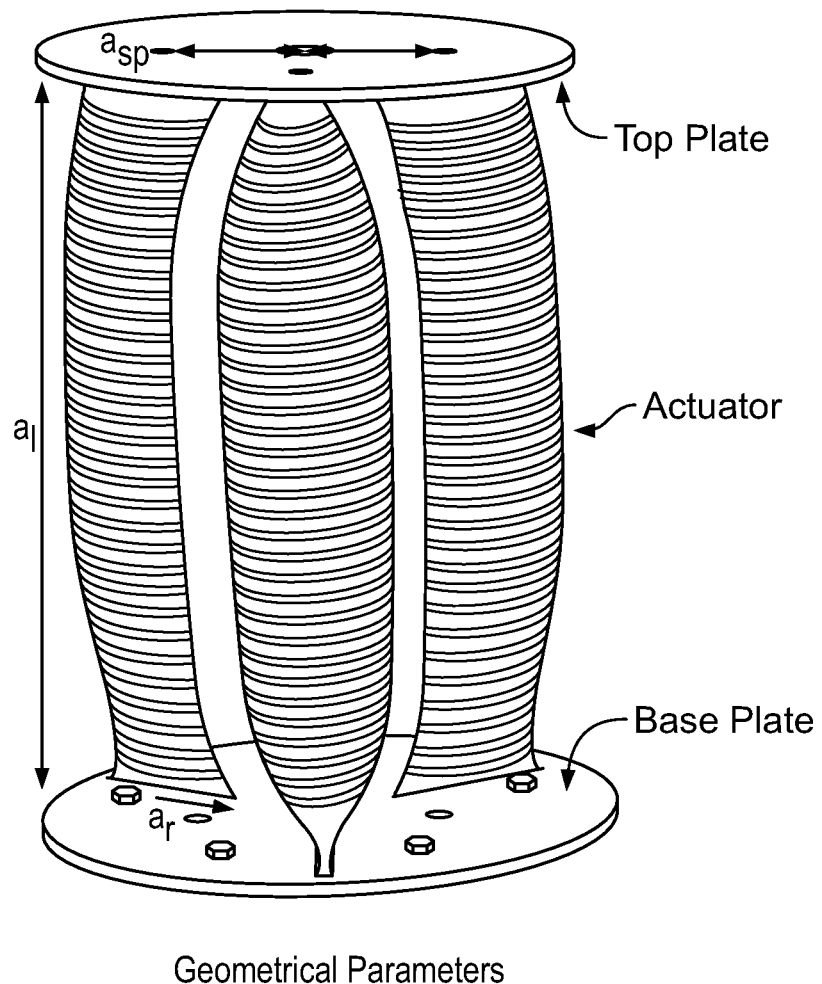

In various exemplary embodiments, a soft continuum robotic module 100 comprises several inflatable actuators 105, for example as illustrated in FIGS. 1 and 7C. Additionally, module 100 may comprise various pneumatic components, pumps, valves, electronic control modules, sensors, and/or the like, in order to govern and/or control operation of the inflatable actuators. The actuators may be attached at each end to a plate, for example a base plate and a top plate. Moreover, in a robotic arm, modules 100 may be connected in series, whereby the top plate of a first module 100 is operable as the base plate of a second module 100, and so forth.

In addition to exemplary actuator 105 designs, this disclosure demonstrates the integration of a highly stretchable, conductive knit-fabric strain sensor 110 on the soft module. Because of sensor 110's high stretchability, it is able to obtain sensory feedback for state estimation of the knit fabric actuators 105, while still allowing actuators 105 to maintain a hyperelastic nature. Furthermore, an exemplary module 100 contains on-board electropnuematic hardware 120, wireless communication components 130, and additional IMU sensors attached to the actuator 105. The all-inclusive on-board system and nature of module 100 allows for communication, computation, distributed sensing, actuation, and control to extend it into real-world applications.

Design and Fabrication

Figure 2:
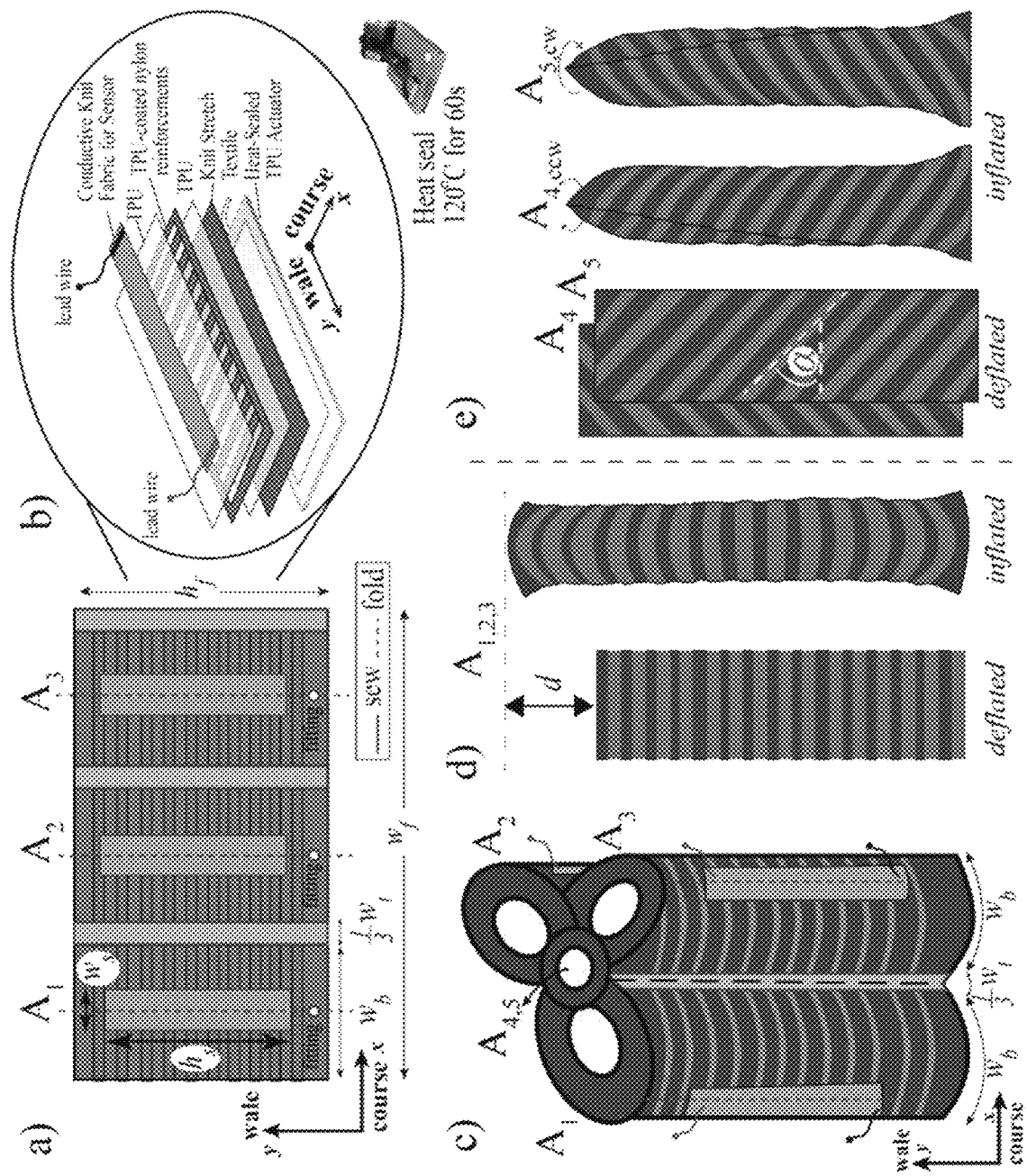
FIG. 2 illustrates components and construction of an exemplary soft continuum robotic module in accordance with various exemplary embodiments.

As seen in biology, muscular hydrostats are found in elephant trunks and octopus arms, which contain muscles or fibers that are oriented longitudinally, circumferentially, radially and/or transversely. When working in tandem with one another, these fibers enable elongating, shortening, and bending motions, while helically arranged fibers create axial torsion or twisting. Inspired by biology, exemplary embodiments utilize a soft continuum robotic module that performs active multi-axis bending, twisting, and extending all within one actuation module. In an exemplary embodiment, each module 100 includes three extending FRTAs 105 for multi-directional bending and linear elongation, and two twisting actuators for bi-directional twisting and counteracting torsional disturbances (for example, as seen in FIG. 2). The size of each soft continuum robotic module 100 is selected so that three modules 100 can eventually be connected in series to a create a full-length soft continuum robotic arm, which may be sized as desired (for example, to match the length of an average sized male arm (0.59 m)). Exemplary embodiments also utilize highly stretchable conductive knit fabric sensors, embedded onto the skin of the knit material, to measure the strain of the FRTAs 105 during elongation and bending.

Material Selection

Exemplary embodiments utilize a bi-directional high-stretch knit material, the COTOWIN Heavy Stretch Elastic Band (Amazon.com Inc., Seattle, Wash.), with a density of 850.3 kg/m$^3$. We tested the inflatable fabric using a burst test, to find out the maximum pressure that the fabrics could withstand before failure, using the ASTM F2054 protocol. Each actuator had a similar fabric-reinforcement arrangement along the surface. An exemplary selected material for the fabric-reinforcements is a 200D TPU-coated nylon fabric (6607, Rockywoods Fabric, Loveland, Colo.), with a density of 840 kg/m$^3$. The inflatable actuator 105 is able to withstand the set maximum safety pressure of 0.69 MPa without bursting, thus showing high robustness and the capability of achieving increased payload. However, any suitable fabric and/or reinforcement may be utilized.

In exemplary embodiments, the material properties of the COTOWIN Heavy Stretch Elastic Band material are characterized using the ISO-139134-1 standard, where the material is stretched both in the wale and course directions, using a universal testing machine (UTM) (Instron 5944, Instron Corp., High Wycombe, United Kingdom). The material is tested both with and without the fabric reinforcements. For the fabrics without reinforcements, in the wale direction (y-direction), parallel to the direction of manufacturing, the fabric had a stretch of 204.94% at 8.84 MPa. In the course direction (x-direction), perpendicular to the direction of manufacturing, the stretch was much stiffer at 12.3% at 32.8 MPa, exceeding the payload set by the universal testing machine of 1 kN without tearing. The fabrics with reinforcements showed an increase of overall stiffness but maintaining similar properties of the textiles at 218.77% at 8.544 MPa (in the wale direction) and 11% at 32.8 MPa (in the course direction), respectively. The material properties of the conductive knit fabric (A321, LessEMF, Latham, N.Y.) used for the an exemplary strain sensor, had a stretch of 272.65%, in the wale direction and 175.52%, in the course direction. The material properties of the woven TPU-coated Nylon (6607, Rockywoods Fabric, CO), which was used as fabric-reinforcements in some embodiments, were determined with a linear elastic modulus: Young's modulus of E=498 MPa and Poisson's ratio of v=0.35.

Fabrication and Integration

In various exemplary embodiments, to fabricate the soft continuum robotic module 100 with embedded sensors, the fabrics are cut into the shape specifications using a laser cutter (Glowforge Prof, Glowforge, Seattle, Wash.). However, any suitable cutting device or system may be used. The different layer of fabrics, as seen in FIG. 2, are precisely aligned, from top-view. A heat press (FLHP 3802, Fancier-Studio, Hayward, Calif.) is used to laminate the sensor fabric, the fabric reinforcement, and the knit base fabric layers together. The widths of the extending and twisting actuators 105 are defined by $w_b$ and $w_t$, respectively. The laminated layered fabric in FIG. 2 is folded along the red dashed line, and sewn using high-stretch elastic thread (Maxi Lock Stretch, American & Efird, Mount Holly, N.C.) along the pink lines, to create the 3D structure seen in FIG. 2. The sensing materials are aligned at the center of the fold lines to measure where the actuator extends the most. $A_{1,2,3}$ represent the three extending actuators that inflate and extend upon pressurization, as seen in FIG. 2.

Due to the centralized strain-limiting layer created by the pink sewn lines seen in FIG. 2, the actuators, $A_{1,2,3}$, will bend when inflated separately or in pairs, but will extend when all three are inflated together. The bi-directional twisting actuators ($A_{4,5}$) are manufactured separately and added to the stem of the soft continuum robotic module as shown in FIG. 2. For the twisting actuators, the fabric reinforcements are angled at the desired twisting angle $\alpha=30°$ for counterclockwise motion (actuator $A_4$) and $\alpha=-30°$ for clockwise motion (actuator $A_5$), as seen in FIG. 2). Because of the high collapsibility and almost zero initial stiffness of fabrics, two twisting actuators are able to fit within the central space of the actuator (as seen in FIG. 2), allowing for a compact design of the bidirectional twisting actuators. The width of the extending and twisting actuators are defined by $w_b$ and $w_t$ correspondingly.

Electronics and Hardware

Exemplary embedded hardware allows independent sensing and control of each soft robotic module 100. To this end, a four-layered system is encased within a cylindrical box (radius=60 mm, height=140 mm), as seen in FIG. 1. As shown in FIG. 3, an exemplary control unit is designed using off-the-shelf components to regulate pressure in the five actuators output lines. A miniature pump (NMP830 HP, KNF Neu-berger, Inc., Trenton, N.J.) is used to generate up to 0.19 MPa of source pressure. However, any suitable hydraulic or other suitable pressure source may be used. The airflow of the unit is controlled by one proportional valve (Enfield Technologies, Shelton, Conn.), and five 3/2-Way solenoid valves (Miniature Solenoid Valve, Parker Hannifin, Hollis, N.H.). The inflation and deflation processes for each actuator are measured by a pressure sensor (ABPMANN004PGAA5, Honeywell International Inc., Morris Plains, N.J.). The orientation of the end-effector is measured by a 9-DOF inertia measurement unit (IMU) (Adafruit BN0055 Board, Adafruit Industries, New York, N.Y.). In some embodiments, the IMU sensor is specifically utilized for measuring twisting and bending. A microcontroller (for example, a Raspberry Pi Zero W, Raspberry Pi Foundation, United Kingdom) controls the pump, valves, pressure and IMU sensor on the module. It contains an onboard Wi-Fi module, allowing a wireless TCP/IP communication between the module and the central PC for sending the desired pressure commands, as well as pressure and sensing measurements. This communication can be extended to inter-module communication if necessary. An overview of an exemplary system 100 is depicted in FIG. 3. However, any suitable control electronics, pumps, and/or the like may be utilized, as desired.

Embedded Sensing

In some exemplary embodiments, module 100 utilizes an embedded knit stretch sensor, aligned with the three extending-bending actuators along the length of the actuator. When the soft module 100 bends, variable constant curvature may be used to model the system. The lengths of the three extending-bending actuators 105 [$s_1$, $s_2$, $s_3$] are estimated by their corresponding resistance sensor values [$R_1$, $R_2$, $R_3$]. The arc parameters of the module are defined in FIG. 6 and the arc length of the central axis of the module S is calculated.

A. Sensor Selection and Characterization

Figure 4:
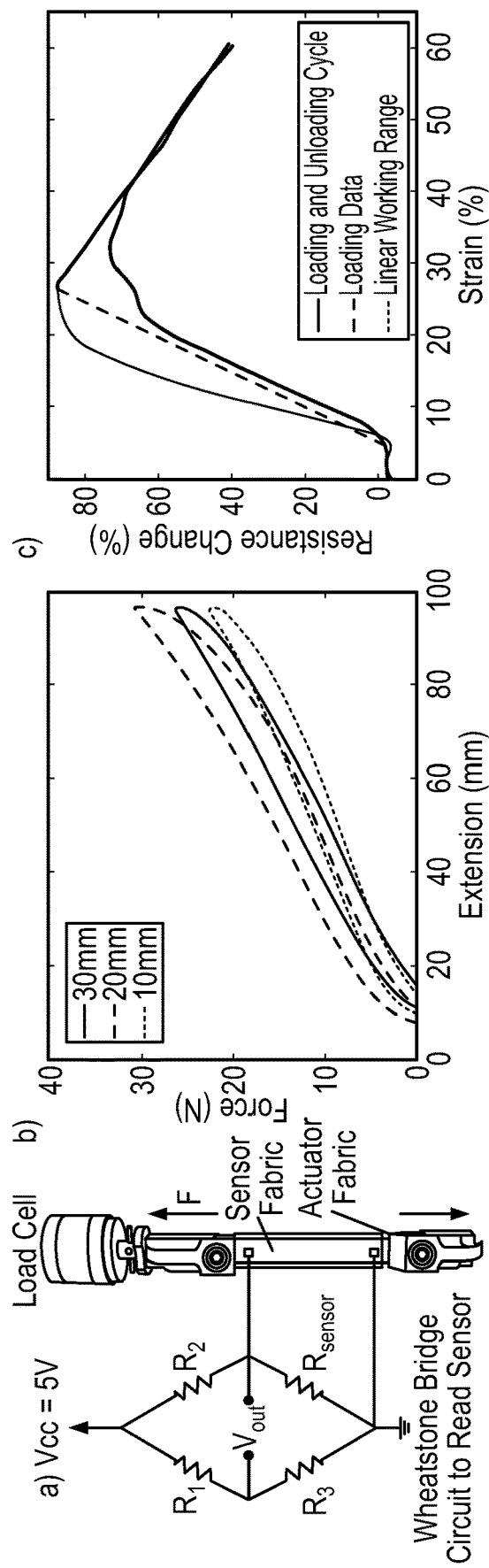
FIG. 4 illustrates sensor setup and characterization of an exemplary soft continuum robotic module in accordance with various exemplary embodiments.

In order to characterize an embedded soft fabric sensor, exemplary embodiments place the sensorized fabric on the UTM to perform loading and unloading tests for ten cycles. To detect the resistance changes in the conductive knit stretch sensor, a customized Wheatstone bridge circuit may be used, as shown in FIG. 4. The first strain cycle was not included in the data analysis to remove any Mullins effect. The strain rate was 96 mm/min based on the actuator's inflation rate to reach the desired bending angle of 90°. The length of the sensor may be selected based on the length of the actuator (for example, 165 mm). The force-extension behaviors of the sensor for different widths were calculated by varying the width along the fold of the actuator to be: 10 mm, 20 mm, and 30 mm. As seen in FIG. 4, the sensors show the maximal hysteresis values of 12.04N, 14.87N and 13.73N at 60% strain, for 10 mm, 20 mm and 30 mm width, respectively. The 10 mm width sensor shows a higher sensing range and lower hysteresis in comparison. The material has a high stretch-to-relax time of 1.5 s and 0 s for loading and unloading. The working range of the 10 mm width sensor was maximized at 26.34% strain and then the resistance begins to decrease for higher strain values, as seen in FIG. 4. This relationship is due to the specific nature of the multi-material combination of the fabric sensor. Finally, the strain-resistance linear characteristic of the 10 mm sensor is shown in FIG. 4. The results show that the fabric sensor's resistance was proportional to the strain within its working range, where the coefficient of the determination using linear regression was $R^2=0.953$. The gauge factor (GF) was also calculated within the linear range to be approximately 3.92, comparable to previous LessEMF conductive fabrics. A high GF value means the sensor has higher sensitivity and is able to detect small changes in strain.

Testing an Exemplary Soft Continuum Robotic Module

In order to evaluate the capability of an exemplary soft continuum robotic module 100, the system may be characterized for its maneuverability and payload capabilities. Additionally, the IMU and conductive knit stretch sensors may be evaluated, for example for state tracking and closed-loop control.

Device Characterization

In order to investigate the load performance of an exemplary soft continuum robotic module 100, three tests for bending, extending, and twisting tasks may be utilized. All bending and torque payload tests were performed on the UTM and each output was measured at small pressure increments of 0.34 mpa MPa until a safety pressure of 0.207 MPa was reached. Each experiment was repeated three times. The performance characteristics of an exemplary soft continuum robotic module 100 are highlighted in Table 1.

TABLE 1

Performance Summary of the Soft Robotic Module

| PROPERTY | SPECIFICATION |
| --- | --- |
| Single actuator mass | 0.03 kg |
| Soft module mass | 0.40 kg |
| Electropneumatics' mass | 1.076 kg |

TABLE 1-continued

Performance Summary of the Soft Robotic Module

| PROPERTY | SPECIFICATION |
| --- | --- |
| Contracted size | 120 × 120 × 200 mm |
| Extended size | 120 × 120 × 234.38 mm |
| Linear RoM | 34.38 mm |
| Angular RoM | 104.02° |
| Single actuator torsional RoM | 166.70° |
| Soft module torsional RoM | 82.70° |
| Linear payload | 231.92 ± 0.41 N |
| Bending payload | 10 ± 0.27N (single side) |
| | 9.32 ± 0.12N (double side) |
| Torsional performance | 0.99 ± 0.01 Nm |

Figure 5A:
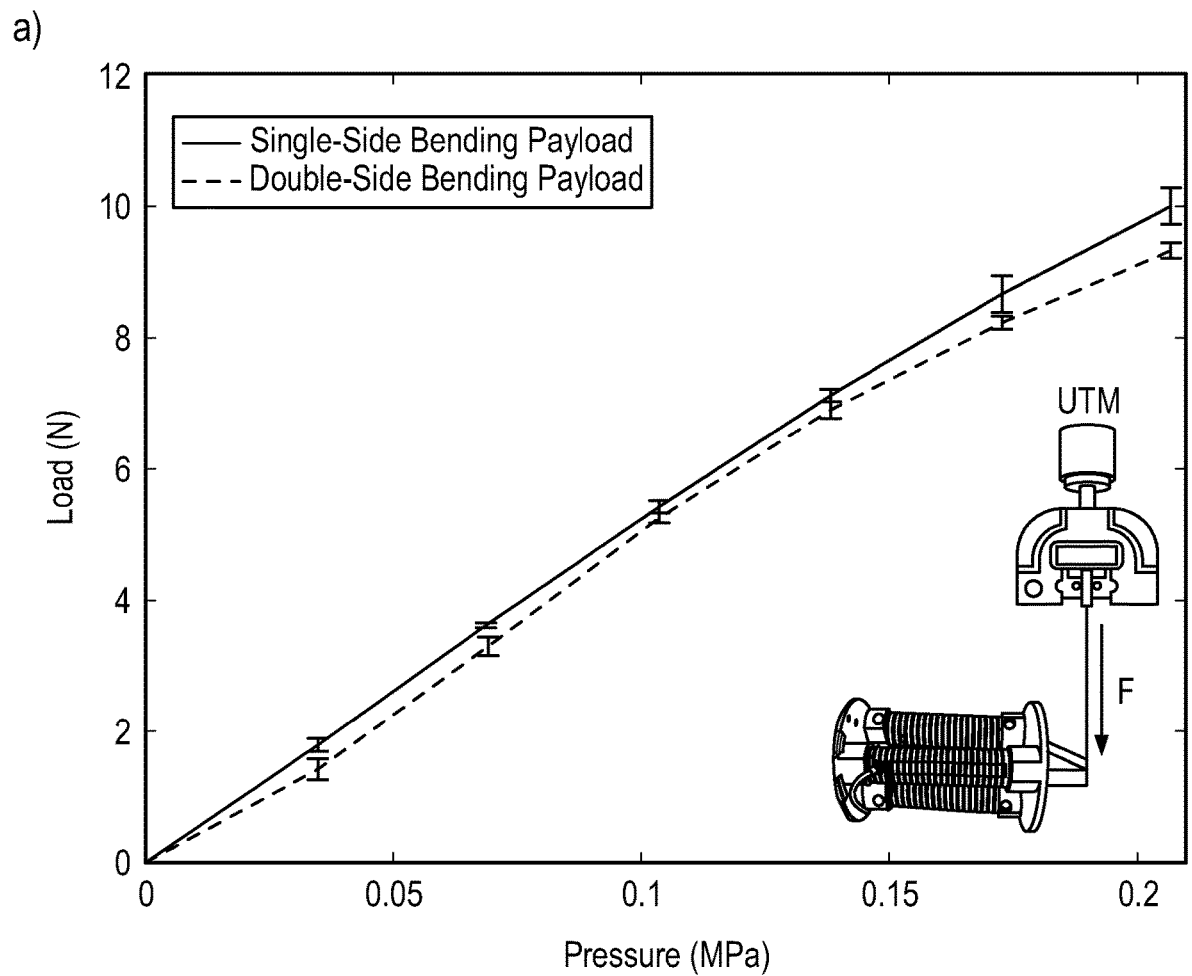
FIGS. 5A, 5B, and 5C characterize operation of an exemplary soft continuum robotic module in accordance with various exemplary embodiments.

Bending Payload Capacity: When one side of an actuator 105 was positioned and inflated, an exemplary module 100's maximum bending payload was 10.00±0.27N, as seen in FIG. 5A. When two adjacent actuators 105 in the module were inflated to the same pressure, the maximum bending payload was noticed to be similar at 9.32+/−0.12N. This is comparable to lifting a weight of almost 1 kg at the actuator length of 0.165 m.

Figure 5B:
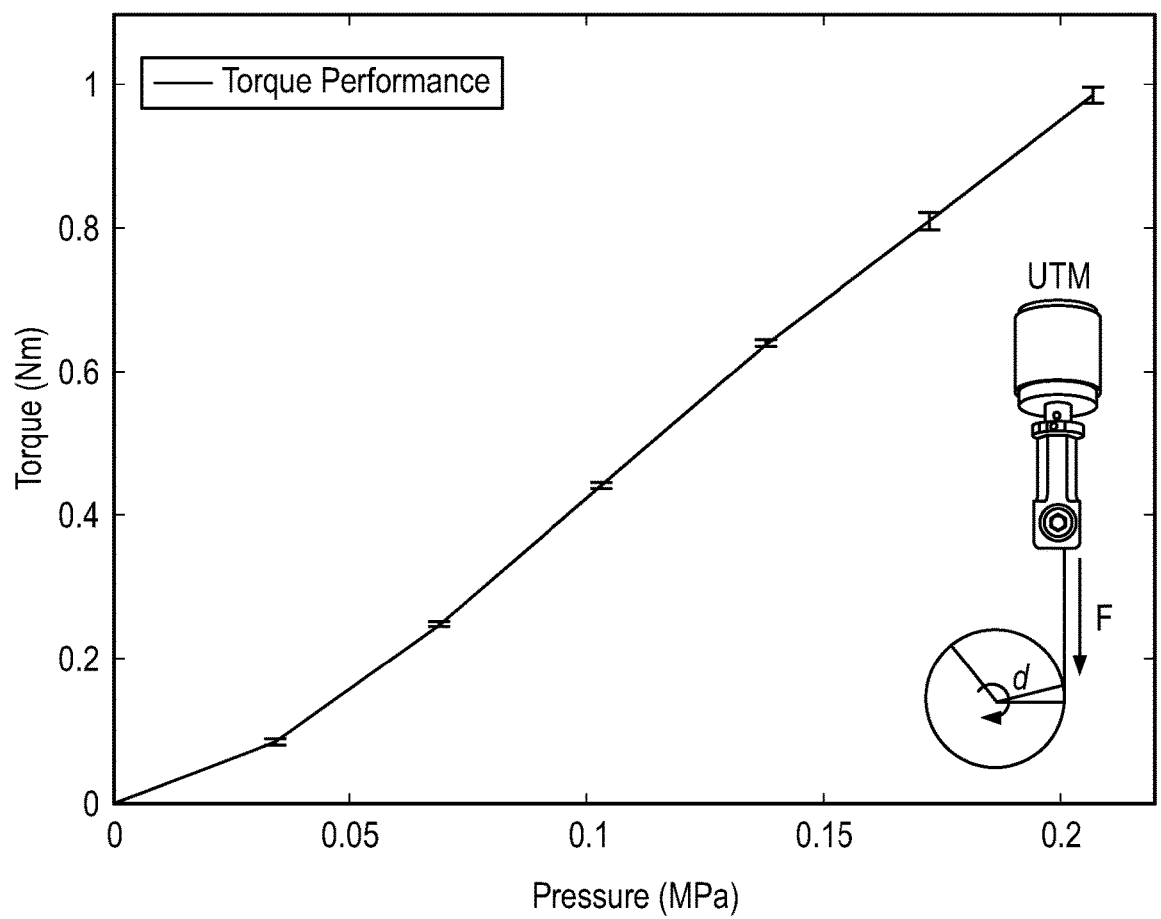

Torsion Torque Capacity: The twisting actuators 105 were inflated, while being connected to the UTM with a string as shown in FIG. 5B. At the maximum pressure, the twisting actuators 105 in the center of module 100 were capable of generating 0.98+/−0.01 Nm with a lever arm of 0.06 m as seen in Table 1. By allowing bi-directional twisting, the twisting actuators 105 are able to counteract any torsion disturbances of up to approximately 1 Nm at the edge of module 100.

Figure 5C:
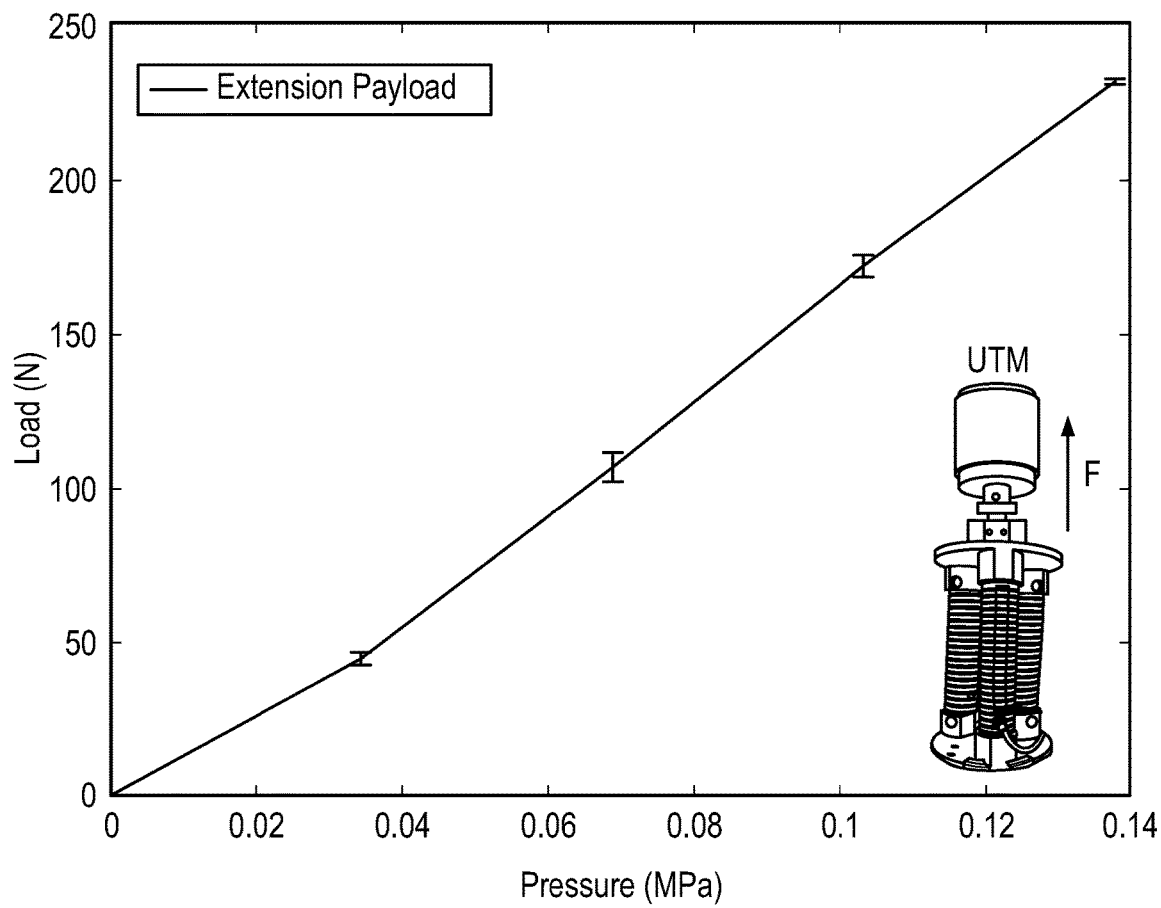

Extension Payload Capacity: In this test, the extension payload capacity of an exemplary module 100 was determined by inflating all three actuators 105 at the same pressure, under the UTM, as shown in FIG. 5C. The maximum extension payload capacity was 231.92+/−0.41N at 0.138 MPa as shown in Table 1.

Range of Motion

To characterize the range of motion (RoM), an exemplary soft continuum robotic module 100 was mounted parallel to the ground. Two sets of three passive markers were mounted at the base and top plates. For each plate, position of the center point and rotation angles are recorded by the motion capture (MOCAP) system (Optitrack, NaturalPoint Inc., Corvallis, Oreg.). For linear elongated motion, three extending-bending actuators 105 were inflated and all held at 0.207 MPa. In the bending test, only a single extending-bending actuator 105 was inflated to 0.207 MPa. In the unconstrained twisting test, the bidirectional twisting actuator 105 was inflated on its own, without being mounted on the soft continuum robotic module 100. The constrained twisting test had all the actuators 105 mounted. For both twisting tests, one twisting actuator 105 was inflated up to 0.172 MPa, while the other one was kept deflated. By inflating the other twisting actuator 105, the RoM was measured for twisting motion in clockwise and counterclockwise directions. Each experiment was conducted three times and the averaged results for elongation, bending and twisting are summarized and presented in Table 1.

Motion Tracking with IMU and Embedded Stretch Sensing

In various exemplary embodiments, a sensorized soft continuum robotic module 100 may be utilized to evaluate the sensing and control performance. An IMU was attached to the center of the top plate and the resistance values were measured by the embedded strain sensor, along the length of the extending-bending actuator 105.

An experiment was conducted to compare the arc angle (θ) estimated using the IMU and the values obtained from the MOCAP system. The same marker set as described above was utilized for the MOCAP system. One extending-bending actuator 105 was inflated to 0.138 MPa and deflated to 0 MPa multiple times while the orientation of the end was recorded. As depicted in FIG. 6, the arc angle estimate obtained using the IMU is fairly accurate with a root mean square error (RMSE) of 1.97° when compared against the measurement from the MOCAP system.

To evaluate the length change estimation of an exemplary module 100, the three extending-bending actuators 105 were inflated to 0.138 MPa and deflated to 0 MPa cyclically. From FIG. 6, it can be observed that the change in length of module 100 can be estimated accurately with an RMSE of 1.19 mm when the stretch sensor and MOCAP measurements are compared.

An experiment to measure the twisting angle (φ) of an exemplary module 100 using both the IMU and the MOCAP was performed. One twisting actuator 105 was inflated to a pressure of 0.138 MPa and deflated to 0 MPa cyclically. FIG. 6 shows that the torsion angle of the module 100 can be successfully estimated using the IMU with an RMSE of 4.69°.

As disclosed herein, in various exemplary embodiments a soft continuum robotic module 100 is robust, compliant, and highly articulated by using combinations of fabric-reinforced textile actuators 105. The soft robotic module 100 is capable of performing 1) multi-DOF bending using the combination of the three extending-bending actuators 105, 2) bi-directional twisting using twisting actuators 105 in the center of module 105, and 3) extending by inflating all the extending-bending actuators 105. A fabrication scheme is disclosed to fabricate the actuators 105 embedded with sensors, by exploiting folding and precision multi-layer fabrication using various 2D manufacturing methods including heat-pressing, sewing, and laser cutting. This exemplary fabrication method allows one-step and rapid manufacturing of any desired number of actuators using just folding and sewing techniques. A larger number of actuators in a module 100 can further provide higher linear stiffness and payload capacity while being redundant, so in these embodiments module 100 would still be functional even if one or more of the actuators 105 were to fail. Accordingly, in various exemplary embodiments 4, 5, 6, 7, 8, 10, 15, or even more actuators may be utilized.

The present disclosure also demonstrates the integration of an embedded conductive knit stretch fabric sensor to measure the elongation of each actuator 105. An additional IMU sensor was used to provide information of the twisting and bending angles of the multi-DOF continuum module 100. Exemplary embodiments also utilize an all-inclusive on-board system that includes electropneumatics and wireless communication. This on-board system may be utilized for a robust, lightweight, fully-integrated soft continuum robotic module 100. Analytical and computational models for the soft continuum robotic module may be created with continuum mechanics and finite element methods, respectively.

With reference now to FIGS. 7A, 7B, and 7C, and FIGS. 8A through 11, in various exemplary embodiments, module 100 is configured to implement a contracting and/or twisting motion. In some embodiments, module 100 implements these motions using only three actuators 105.

In some embodiments, each soft continuum robotic module 100 includes three bending FRTAs 105, as seen in FIGS. 7A, 7B, and 7C. The fabrication process of module 100 may be similar to those disclosed above. This setup naturally allows module 100 to bend in multi-directions, by inflating a single actuator 105 or two adjacent actuators 105. A difference between these exemplary embodiments and other exemplary embodiments includes that by inflating all the three actuators 105 together, a helical twisting and contracting motion occurs, instead of an extension motion. In accordance with principles of the present disclosure, this motion may occur because an inextensible sewing line on each actuator 105 eliminates the ability for the actuator 105 to extend. This leads the three actuators 105 to bend in three different directions, promoting a rotational motion on the top plate and in turn forcing a twisting helical motion as the soft body of the actuators 105 collapse at the same time or similar times.

In various exemplary embodiments, performance of module 100 may be configured by varying the system's geometrical properties, for example as seen in FIG. 7C. The length of the actuators 105 ($a_l$) was evaluated for lengths of 170, 190, 210 mm. However, any suitable length for actuators 105 may be utilized. The spacing ($a_{sp}$) between the three actuators 105 was evaluated for two different spacing of 22 and 77 mm. Again, any suitable spacing may be utilized. The radius of the actuators 105 ($a_r$) was varied between 20, 25, 30 mm in some embodiments of module 100, but any suitable radius may be utilized. In some embodiments, it was determined that after 103.4 kPa, the actuators 105 of an exemplary module 100 with $a_r$=30 mm, started showing uncontrolled radial expansion leading to failure and the thread on the seam started peeling, before any significant twisting and contracting motion occurred.

In some embodiments, payload tests were performed on a Universal Tensile Machine (Instron 5944; Instron Corp., High Wycombe, UK). For the mobility tests, two sets of passive markers were mounted at the base and top plates of an exemplary module 100. The markers were recorded utilizing a motion capture system (Optitrack, NaturalPoint Inc., Corvallis, Oreg.). Each experiment was repeated three times and the actuators in module 100 were inflated at pressure intervals of 34.5 kPa.

Bending Performance

In some exemplary embodiments, in a bending test, $a_{sp}$ was set at 77 mm, $a_r$=25 mm, and the length of the actuator 105, $a_l$ was set at 190 mm. Only a single bending actuator 105 on the module 100 was inflated up to 241.3 kPa. The module 100's maximum bending payload with a single bending actuator 105 inflated was 7.63+/−1.2 N and the maximum bending angle observed was 148.7+/−0.61°.

Twisting Performance

Figure 8A:
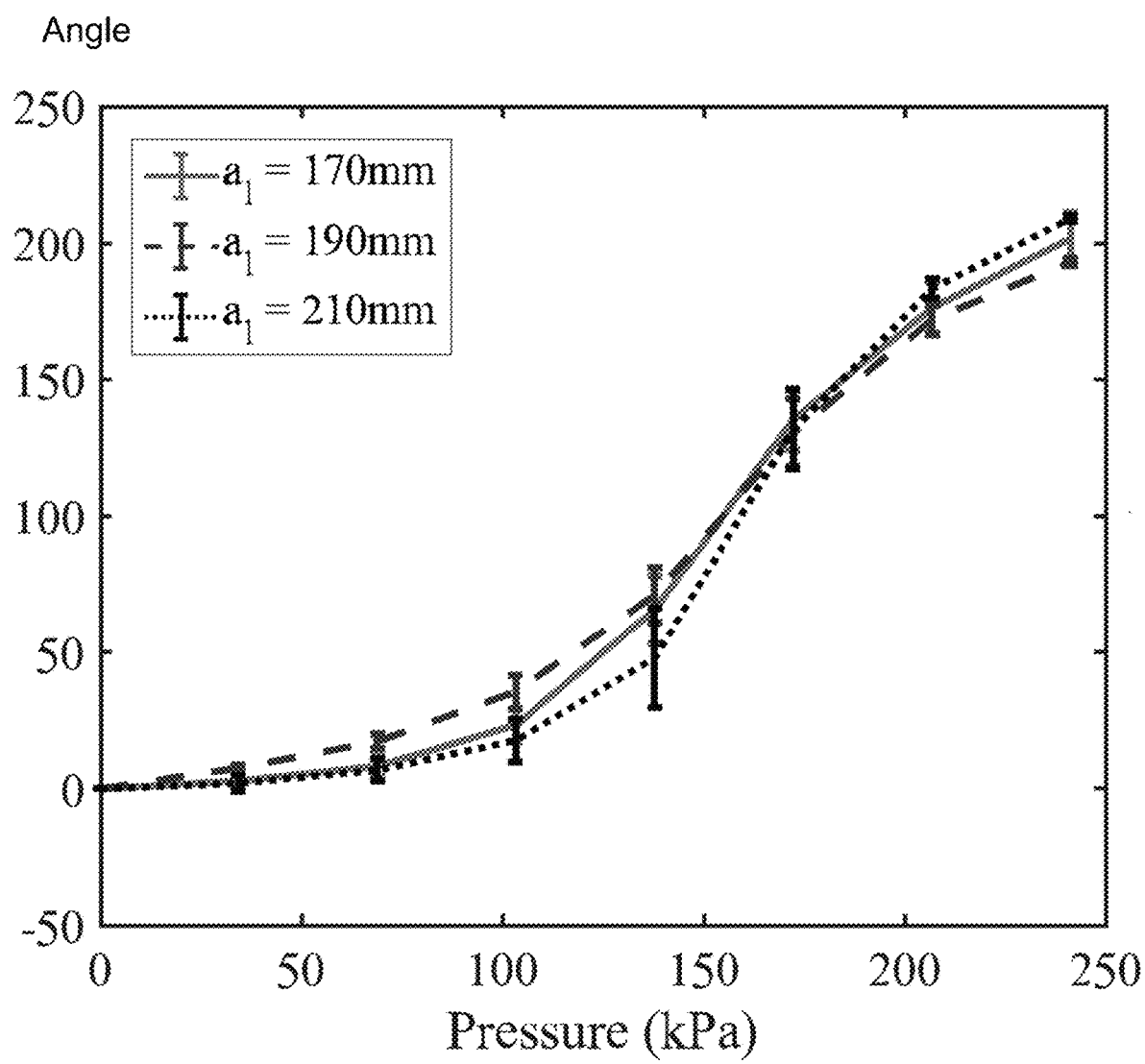
FIGS. 8A, 8B, and 8C characterize operation of an exemplary soft continuum robotic module in accordance with various exemplary embodiments.

In some exemplary embodiments, by varying the length of the actuators 105 ($a_l$), module 100 was able to twist up to ±201.62+/−9.33°, 193.14+/−1.17°, or 208.99+/−1.08° at 241.3 kPa, respectively. We notice that the twisting performance of module 100 was unaffected by the change in length of the actuators 105, as seen in FIG. 8A.

Figure 8B:
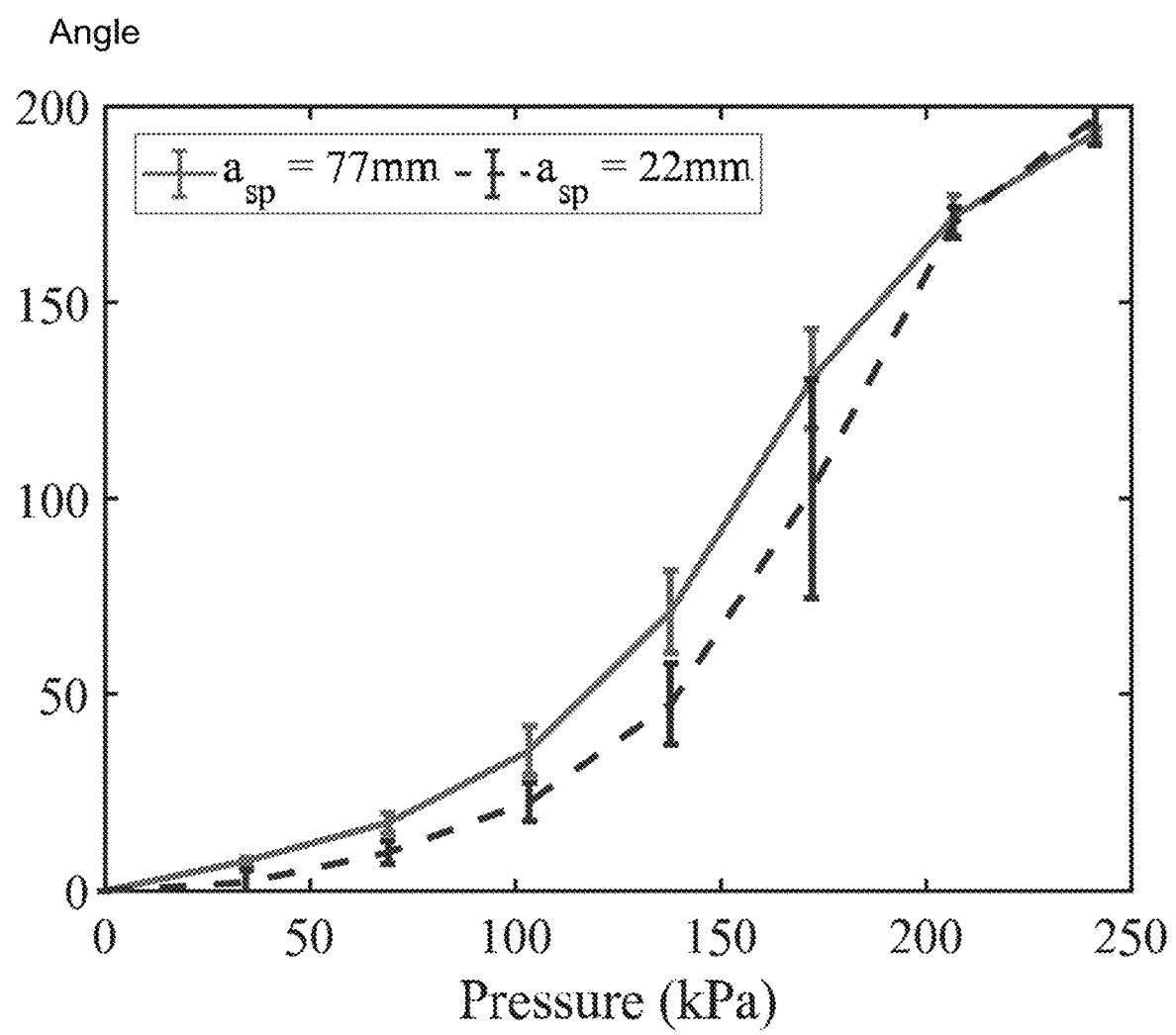
Figure 8C:
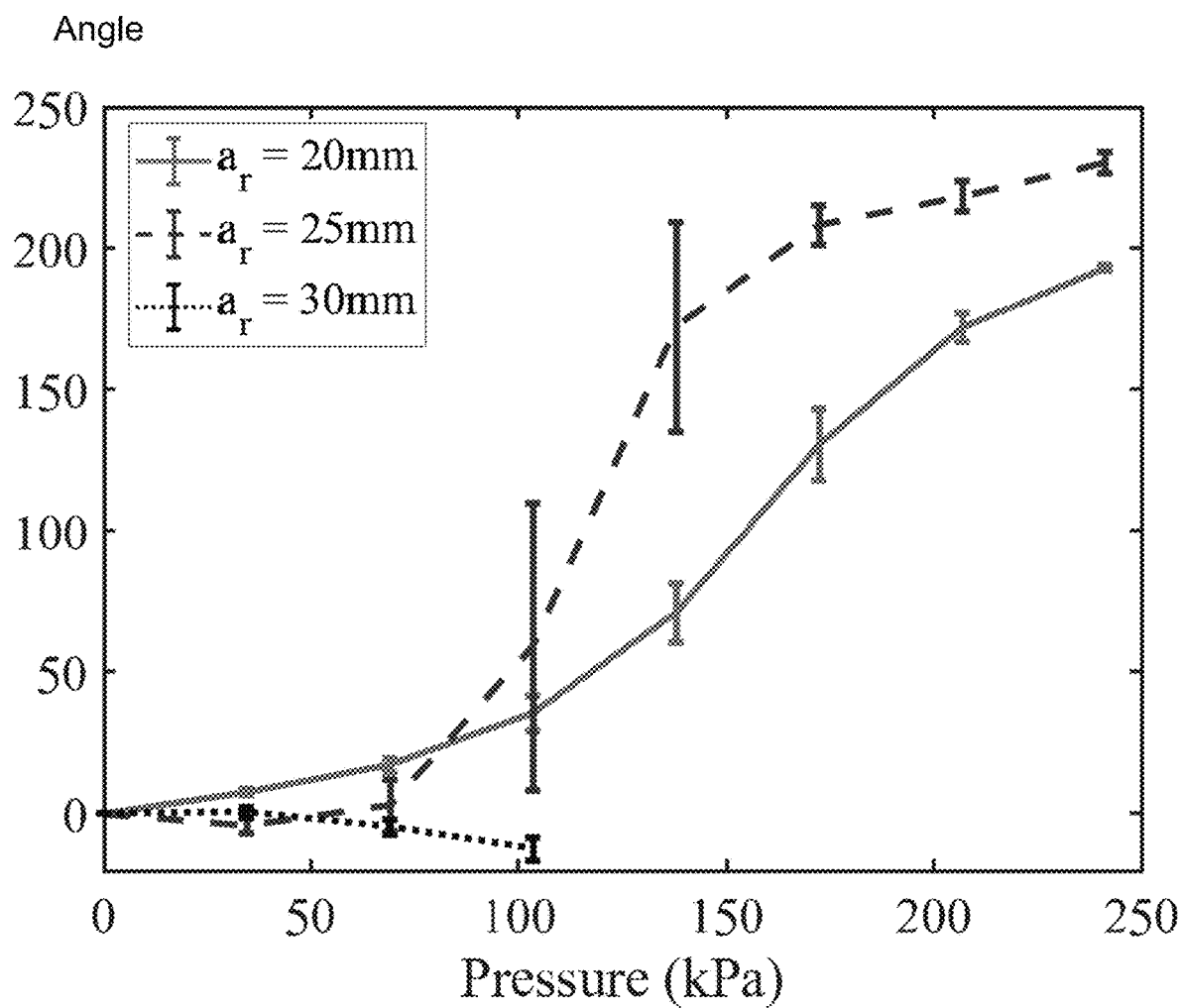

Varying the spacing between the actuators 105, as shown in FIG. 8B, did not affect the final twisting angle of the actuator 105 at 241.3 kPa. But it was noticed that by placing the actuators 105 slightly further apart at $a_{sp}$=77 mm, module 100 was twisting more until about 206.8 kPa. For actuators 105 with a radius of $a_r$=20 mm and $a_r$=25 mm, the twisting angles at 241.3 kPa were 193.14+/−1.17° and 230.36+/−3.70° respectively. The actuator 105 with a radius of $a_r$=25 mm showed a better overall twisting performance.

Therefore, in various exemplary embodiments, in module 100 the maximum actuator radius for an actuator 105 with a length of 190 mm is selected to be approximately 25 mm.

Contracting Performance

Figure 10A:
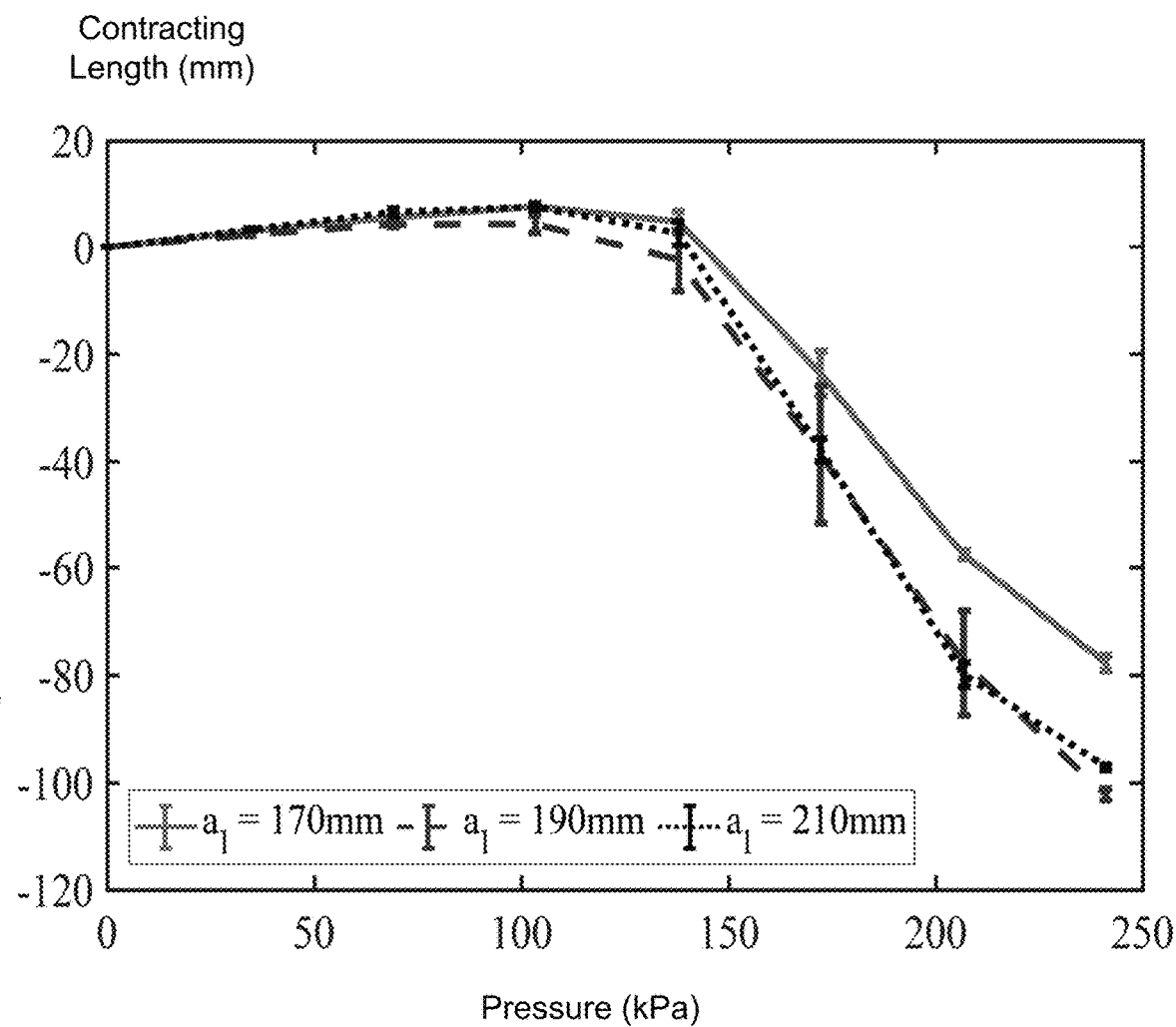
FIGS. 10A, 10B, 10C, 10D, 10E, and 10F characterize mobility and/or payload for an exemplary soft continuum robotic module in accordance with various exemplary embodiments.

In some exemplary embodiments, by varying $a_l$, it highlighted similar contraction length between modules 100 configured with $a_l$=190 mm and $a_l$=210 mm, with contraction of 102.28+/−1.08 mm and 97.10+/−0.46 mm at 241.3 kPa, respectively, as seen in FIG. 10A. However, module 100 with $a_l$=170 mm only had a contraction length of 77.77+/−1.47 mm.

Figure 10B:
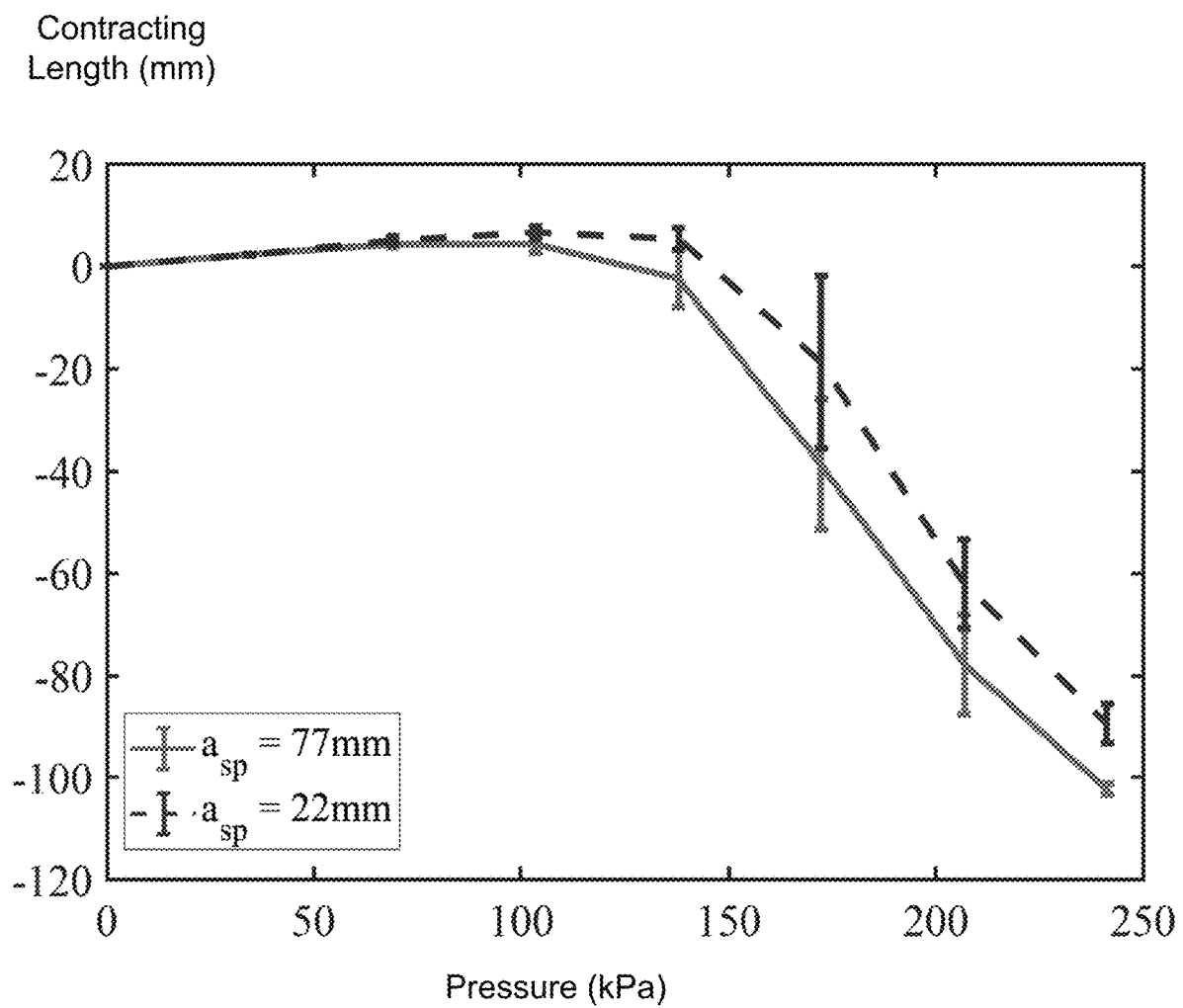
Figure 10C:
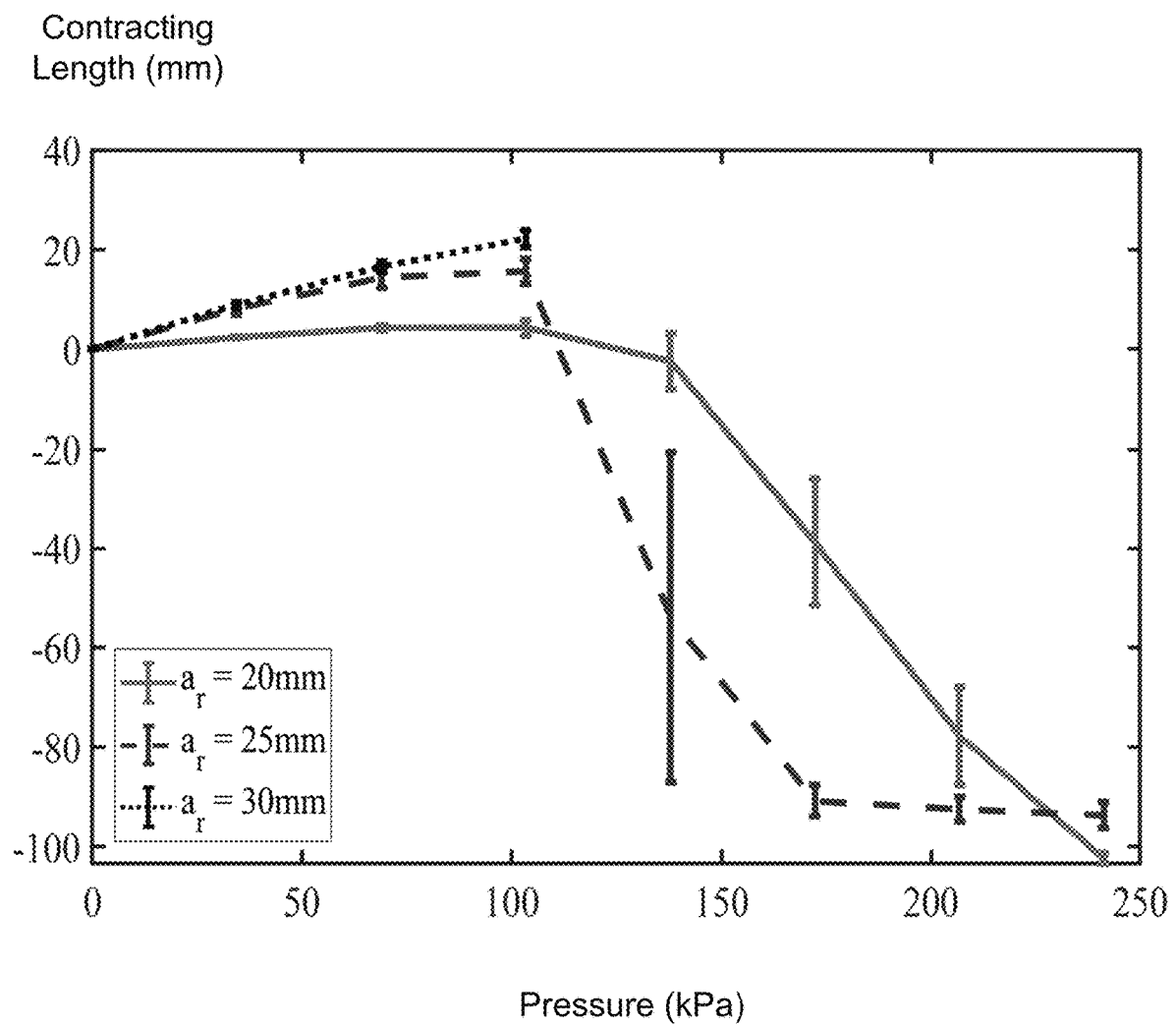
Figure 10D:
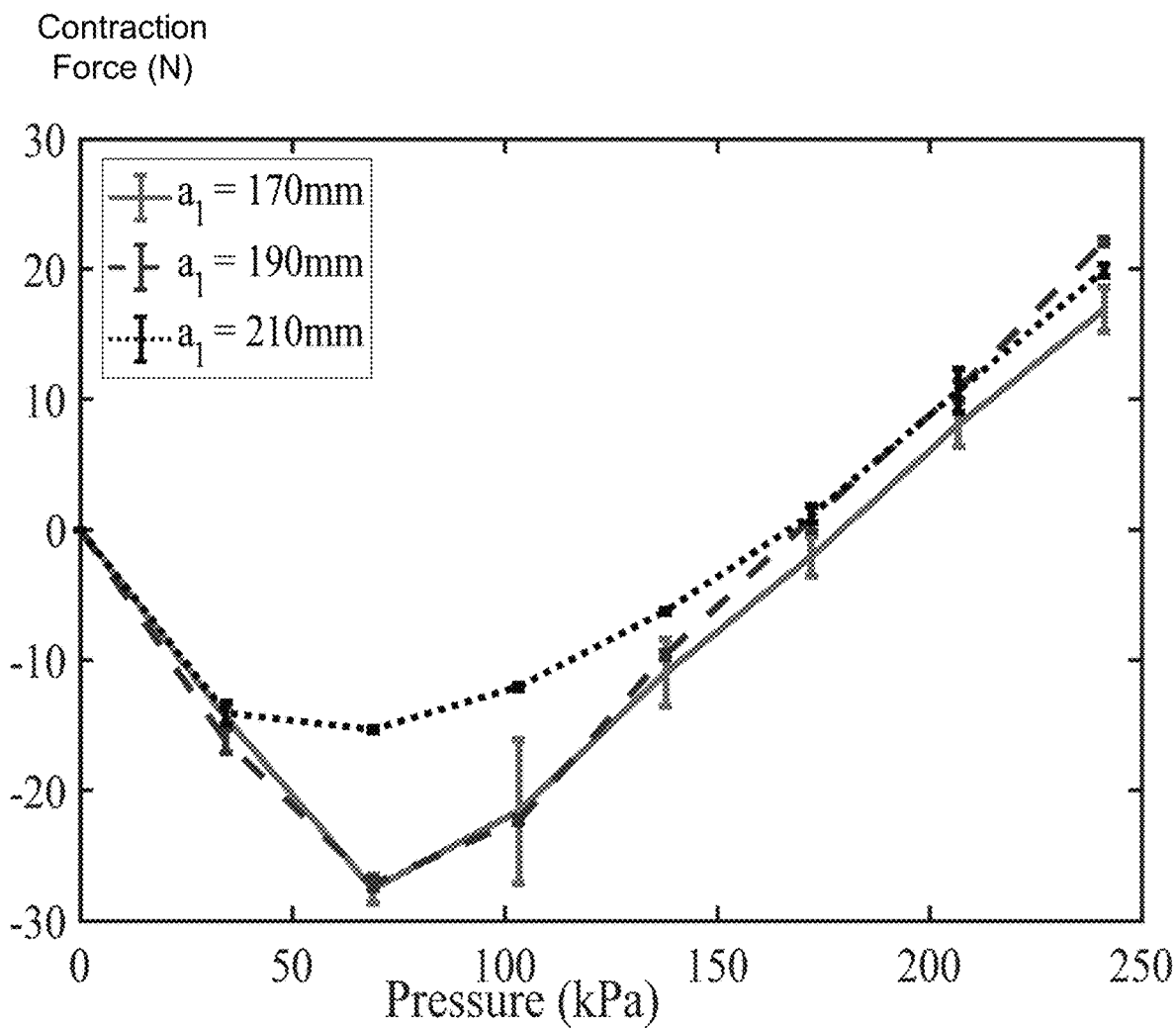
Figure 10E:
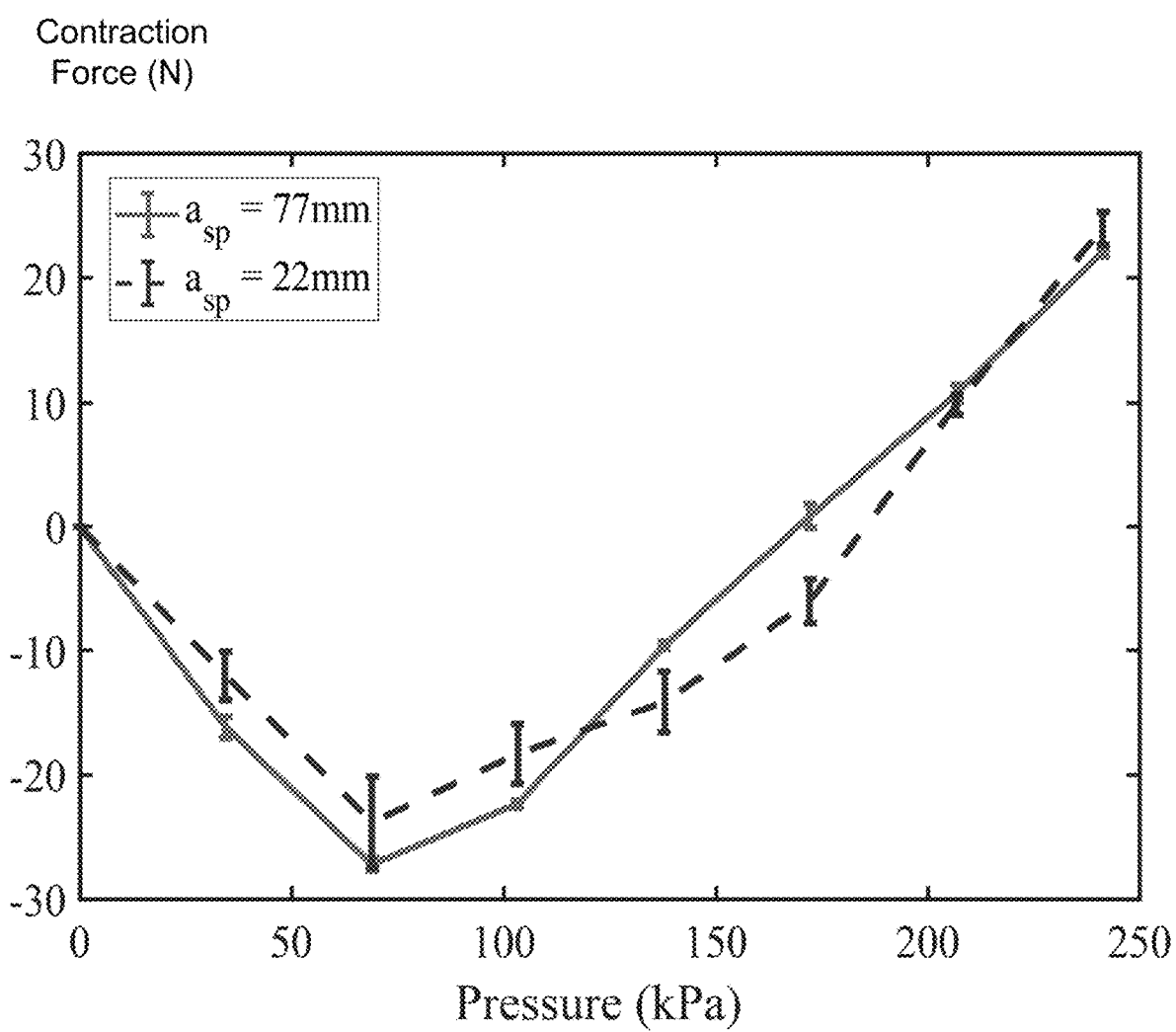

The change in $a_l$ also affected the contraction force of exemplary modules 100, as seen in FIG. 10D. The maximum contraction payload capacity was respectively 16.89+/−1.73N, 22+/−0.28N, and 19.8667+/−0.48N for $a_l$=170 mm, 190 mm and 210 mm. It will be appreciated that in these operations for module 100, before creating a contraction pulling force, module 100 extends very slightly, creating a pushing force of −27.5+/−1.11N, −27.2+/−0.48N and −14.1+/−0.83N respectively. This highlights that an exemplary module 100 with the longest actuators ($a_l$=210 mm), shows the smallest pushing force before starting to contract.

As shown in FIG. 10B, the larger the spacing distance between actuators 105, the more module 100 contracts. At 206.8 kPa, module 100 with $a_{sp}$=22 mm and $a_{sp}$=77 mm had the contracting lengths of 89.37+/−3.78 mm and 102.28+/−1.09 mm, respectively. The change in spacing between the actuators 105, $a_{sp}$, showed less of an effect on the contraction force of the module 100, seen in FIG. 10E. Thus, module 100 with $a_{sp}$=22 mm and $a_{sp}$=77 mm had contract forces of 24+/−1.29N and 22.07+/−0.28N, respectively.

Similar to the twisting performance, in some embodiments module 100 with the largest actuator 105 radius ($a_r$=30 mm) was not able to contract as the pressure increased as well, seen in FIG. 10C. We also observed that module 100 with $a_r$=20 mm and $a_r$=25 mm had contracting lengths of 102.28+/−1.09 mm and 93.71+/−2.67 mm at 241.3 kPa, respectively. Module 100 with $a_r$=25 mm achieved the maximum contracting length earlier at 172.4 kPa, showing a better overall contracting mobility performance.

Figure 10F:
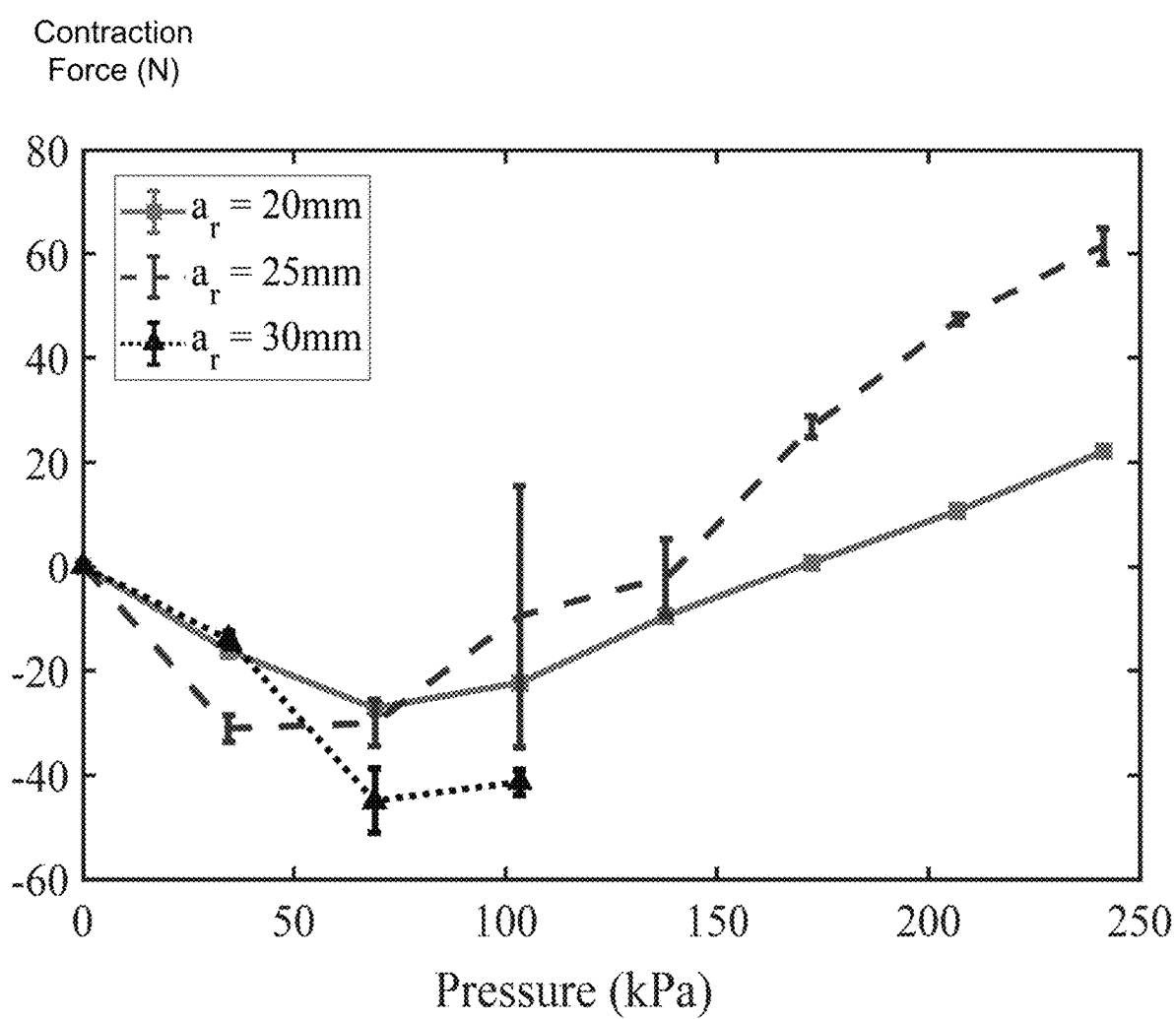
Figure 12:
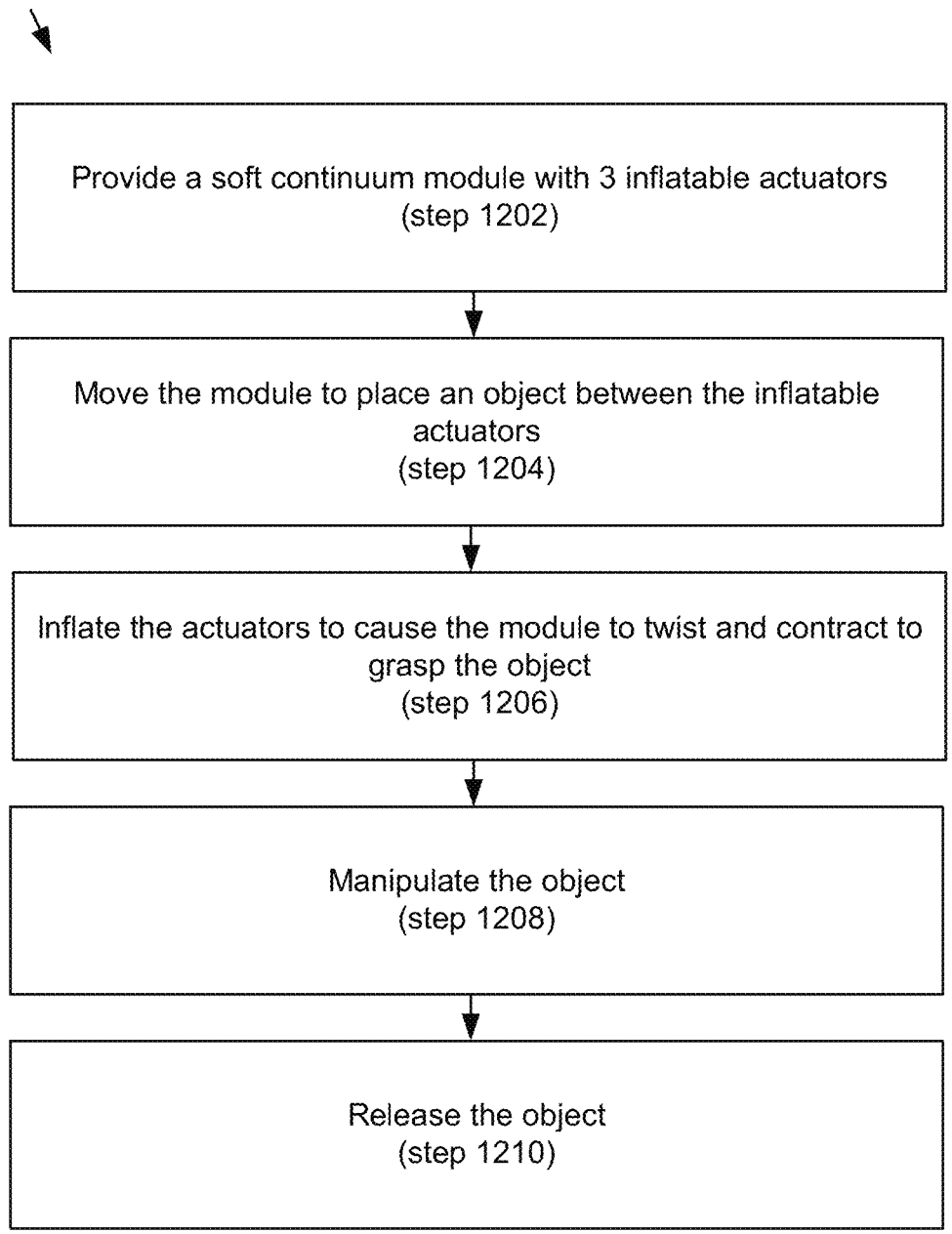
FIG. 12 illustrates a method for use of exemplary soft continuum robotic module in accordance with various exemplary embodiments.

In some configurations, module 100 having a large actuator 105 radius may not be able to contract, for example as seen in FIG. 10F. We also saw a larger contraction force of 61.65+/−3.33N for module 100 with $a_r$=25 mm compared to module 100 with $a_r$=20 mm with a contraction force of 22.07+/−0.28N at 241.3 kPa.

In various exemplary embodiments, module 100 may be utilized to grasp and manipulate objects.

Bionic Winding Manipulator: The twisting and contracting motion profile of exemplary module 100 highlighted a unique grasping methodology using bionic winding, for example as seen in FIG. 11. In this grasping methodology, the object to be grasped is placed between the actuators, and then the twisting actuators contract to grasp the object. Grasping performance of module 100 was demonstrated by grasping three different types of objects with different weights, sizes and textures. A ball (25.7 g), a wooden block (240.5 g), and a plastic water bottle (500.4 g) were grasped, manipulated, and thereafter released, shown in FIG. 11.

In an exemplary embodiment, a method 1200 for grasping an object comprises: providing a module 100 comprising three inflatable actuators (step 1202); moving module 100 such that the object is disposed at least partially between at least two of the actuators (step 1204); inflating the inflatable actuators to cause module 100 to twist and contract (step 1206) to grasp the object. Method 1200 may further comprise moving module 100 to move the object (step 1208); and deflating the inflatable actuators to release the object (step 1210). The steps may be repeated, as desired, in order to repeatedly manipulate an object or manipulate multiple objects in turn.

Soft Robotic Wrist: In various embodiments, module 100 may be operable as a soft robotic wrist, for example for twisting to uncap and cap a bottle, as seen in FIG. 11. A plate with a cut out with the same radius of the bottle cap was attached to the end of the actuator. When the module is pressed against the bottle cap a snug fit is established. Then, by inflating the actuators module twists to uncap the bottle, for example in a counter-clockwise motion. To cap the bottle again, the actuators in the module are deflated, creating a clockwise motion. Thus, any suitable twisting motion or application may be implemented via attaching an appropriate end-effector to module 100.

Figure 9:
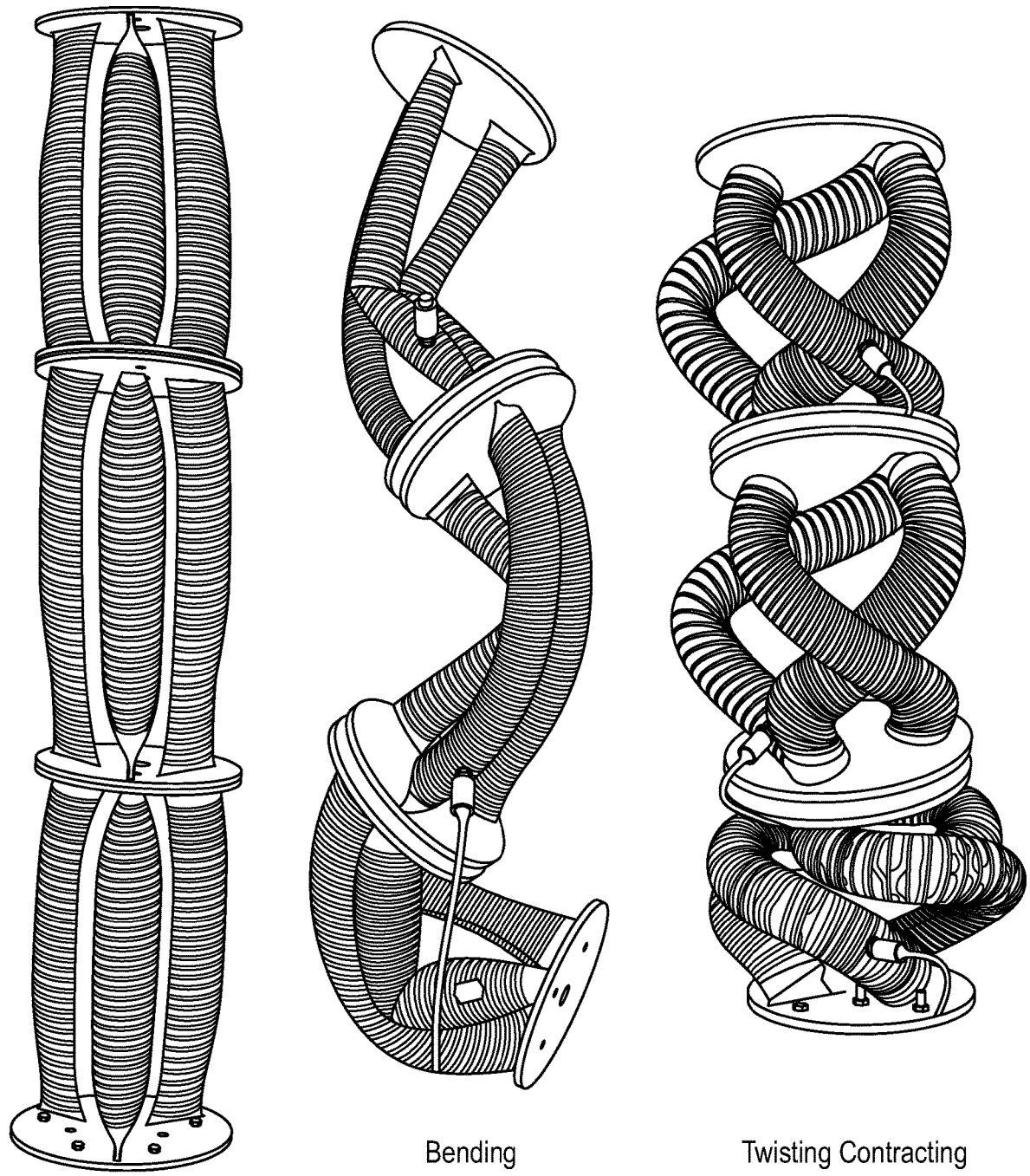
FIG. 9 illustrates operation of a robotic arm comprising multiple soft continuum robotic modules in accordance with various exemplary embodiments.

Soft Continuum Robotic Arm: To assemble an exemplary soft continuum robot arm (SCRA), connector pieces at the end of each soft module may be designed to easily attach and detach to each other, for example using nuts and bolts. Exemplary modules 100 utilized herein were made of actuators with a length of 190 mm, to combine to create a SCRA with a length of approximately 590 mm. In some exemplary embodiments, the SCRA may implement bending and contracting, for example as seen in FIG. 9. In one embodiment, the full arm was able to contract to approximately 301 mm, which is approximately 48.98% contraction in total.

Principles of the present disclosure emphasize the design, characterization, and evaluation of a new soft continuum module that utilized only 3 actuators to be able to perform multi-axis bending and a coupled motion of helical twisting and contracting. The geometrical parameters of the module may be selected based on how the length and radius of the actuators and spacing between them affect the motion and payload of the module, when inflated with an input pressure. Exemplary embodiments utilize the disclosed actuator as a bionic winding manipulator and soft continuum robot arm.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A soft continuum robotic module, comprising:
   a first set of inflatable actuators, the first set of inflatable actuators operable to extend the robotic module;
   a second set of inflatable actuators, the second set of inflatable actuators operable to twist the robotic module;
   an inflation component to inflate and deflate the inflatable actuators; and
   a stretch sensor disposed on at least one inflatable actuator in order to characterize movement and/or positioning of the soft continuum robotic module,
   wherein the inflatable actuators comprise a knit stretch fabric, and
   wherein at least one inflatable actuator comprises:
      a conductive knit fabric for use as a sensor;
      a first layer of thermoplastic polyurethane (TPU);
      a TPU-coated nylon reinforcement layer;
      a second layer of TPU;
      a knit stretch textile; and
      a heat-sealed TPU actuator.

2. The soft continuum robotic module of claim 1, wherein the first set comprises three inflatable actuators, and wherein the second set comprises two inflatable actuators.

3. The soft continuum robotic module of claim 1, wherein the module has an angular range of motion in excess of 100 degrees.

4. The soft continuum robotic module of claim 1, further comprising:
   a rigid base plate coupled to a first end of each inflatable actuator; and
   a rigid top plate coupled to a second, opposing end of each inflatable actuator.

5. A robotic arm, comprising:
   a first soft continuum robotic module;
   a second soft continuum robotic module coupled to the first soft continuum robotic module via a plate acting as the top plate of the first module and a base plate of the second module; and
   a third soft continuum robotic module coupled to the second soft continuum robotic module via a plate acting as the top plate of the second module and the base plate of third second module,
   wherein each robotic module comprises at least three inflatable actuators, and wherein each inflatable actuator comprises:
      a conductive knit fabric for use as a sensor;
      a first layer of thermoplastic polyurethane (TPU);
      a TPU-coated nylon reinforcement layer;
      a second layer of TPU;
      a knit stretch textile; and
      a heat-sealed TPU actuator.

6. The robotic arm of claim 5, wherein the third soft continuum robotic module is operable to grasp an object.

* * * * *